US010863577B2

(12) United States Patent
Aminaka

(10) Patent No.: US 10,863,577 B2
(45) Date of Patent: Dec. 8, 2020

(54) APPARATUS FOR NETWORK SELECTION

(71) Applicant: NEC Corporation, Tokyo (JP)

(72) Inventor: Hiroaki Aminaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/468,038

(22) PCT Filed: Aug. 25, 2017

(86) PCT No.: PCT/JP2017/030500
§ 371 (c)(1),
(2) Date: Jun. 10, 2019

(87) PCT Pub. No.: WO2018/109986
PCT Pub. Date: Jun. 21, 2018

(65) Prior Publication Data
US 2020/0022211 A1 Jan. 16, 2020

(30) Foreign Application Priority Data
Dec. 13, 2016 (JP) ................................. 2016-241717

(51) Int. Cl.
H04W 76/45 (2018.01)
H04W 4/90 (2018.01)
(Continued)

(52) U.S. Cl.
CPC ............. H04W 76/45 (2018.02); H04W 4/90 (2018.02); H04W 48/18 (2013.01); H04W 88/16 (2013.01)

(58) Field of Classification Search
CPC ....... H04W 76/45; H04W 48/18; H04W 4/90; H04W 88/16; H04W 76/40; H04W 24/04;
(Continued)

(56) References Cited

U.S. PATENT DOCUMENTS

2012/0188878 A1* 7/2012 Simon ..................... H04W 4/06
370/241
2015/0011183 A1* 1/2015 Sawai .................. H04M 15/851
455/408

(Continued)

FOREIGN PATENT DOCUMENTS

JP 2015-207955 A 11/2015
WO 2013/132901 A1 9/2013

OTHER PUBLICATIONS

3GPP TS 23.468 V13.3.0 (Dec. 2015), "3rd Generation Partnership Project; Technical Specification Group Services and System Aspects; Group Communication System Enablers for LTE (GCSE_LTE); Stage 2 (Release 13)", Dec. 2015, 30 pages total.

(Continued)

Primary Examiner — Nimesh Patel

(57) ABSTRACT

A terminating apparatus (801) is configured to terminate first communication, second communication, and third communication. The first communication is unicast communication, the second communication is multicast communication, and the first and the second communications are provided by a first network. The third communication is provided by a second network. It is thus, for example, possible to contribute to improving efficiency or appropriateness of a selection between multicast transmission and unicast transmission and a selection between use of a PS-LTE network and use of a commercial LTE network.

10 Claims, 27 Drawing Sheets

(51) Int. Cl.
*H04W 48/18* (2009.01)
*H04W 88/16* (2009.01)

(58) Field of Classification Search
CPC ..... H04W 4/06; H04W 72/005; H04W 88/08; H04W 76/50; H04W 76/14; H04W 88/04; H04W 8/005; H04W 8/14; H04W 28/0236; H04W 36/00; H04W 4/08; H04W 88/02; H04W 24/10; H04W 36/0007; H04W 36/0058; H04W 36/30; H04W 36/32; H04W 48/10; H04W 48/20; H04W 72/0473; H04W 76/27; H04W 88/182; H04W 4/10; H04W 76/00; H04W 72/12; H04W 92/18; H04W 24/02; H04W 28/0215; H04W 28/0268; H04W 4/80; H04W 52/0229; H04W 52/245; H04W 52/267; H04W 52/383; H04W 72/04; H04W 72/046; H04W 72/10; H04W 12/007; H04W 12/06; H04W 40/22; H04W 88/18; G08B 25/08; G08B 27/001; H04L 12/1895; H04L 67/104; H04L 67/18; H04L 67/2842; H04L 1/08; H04L 45/16; H04L 65/4061; H04L 41/083; H04L 43/106; H04L 61/2007; H04L 61/3085; H04L 61/6054; H04L 63/306; H04L 65/1016; H04L 65/1059; H04L 65/1063; H04L 65/1096; Y02D 70/10; Y02D 70/1242; Y02D 70/1262; Y02D 70/14; Y02D 70/144; Y02D 70/164; Y02D 70/168; Y02D 70/20; Y02D 70/21
See application file for complete search history.

(56) References Cited

U.S. PATENT DOCUMENTS

| 2015/0312827 | A1  | 10/2015 | Okita et al. |         |
|--------------|-----|---------|--------------|---------|
| 2016/0323050 | A1* | 11/2016 | Song         | H04W 28/14 |
| 2016/0381720 | A1* | 12/2016 | Baek         | H04W 76/12 |
|              |     |         |              | 370/329 |

OTHER PUBLICATIONS

TTA, U.S. DoC, "Critical Communications in the 5G", 3GPP TSG-SA WG1 Adhoc Meeting on SMARTER (5G) S1-153069, Vancouver, Canada, Oct. 19-21, 2015, 2 pages total.
International Search Report dated Nov. 7, 2017 issued by the International Searching Authority in International Application No. PCT/JP2017/030500.
Written Opinion dated Nov. 7, 2017 issued by the International Searching Authority in International Application No. PCT/JP2017/030500.

* cited by examiner

APPARATUS FOR NETWORK SELECTION

This application is a National Stage Entry of PCT/JP2017/030500 filed on Aug. 25, 2017, which claims priority from Japanese Patent Application 2016-241717 filed on Dec. 13, 2016, the contents of all of which are incorporated herein by reference, in their entirety.

TECHNICAL FIELD

The present application relates to radio communication and, in particular, to a selection of a network for data distribution.

BACKGROUND ART

Using a Long Term Evolution (LTE) network for a public safety network has been discussed. Note that the public safety network is a radio communication network used for emergency services such as police, firefighting, and a medical emergency. An LTE system for the public safety network is referred to as a Public Safety LTE (PS-LTE). Group communication is one of the main services required for the public safety network. Third Generation Partnership Project (3GPP) has already introduced a Multimedia Broadcast Multicast Service (MBMS) to enable the group communication. Accordingly, it is expected that the MBMS and the enhancements thereof will be used for providing the group communication in PS-LTE using the MBMS and the enhancements thereof.

FIGS. 1 and 2 show examples of PS-LTE networks supporting group communication. A Group Communication Service Application Server (GCS AS) is used to provide the group communication. The architecture of the group communication including the GCS AS is specified in Non-Patent Literature 1 (3GPP TS 23.468 V13.3.0 (2015-12)). The GCS AS is an entity of an application domain and communicates with PS devices (i.e., UEs) on an application layer.

The GCS AS provides one-to-one communication and one-to-many communication. The GCS AS can use an MBMS bearer service for transferring application signaling and delivering application data to a group of UEs. The GCS AS can instead use Evolved Packet System (EPS) bearer services for transferring application signaling and delivering application data to a group of UEs, or can use both an MBMS bearer service and EPS bearer services. That is, the GCS AS selects which of UE-dedicated unicast bearer services (i.e., EPS bearer services), a multicast bearer service (i.e., MBMS bearer service) or both is used for distribution of application signaling and data to a group of UEs. Each EPS bearer service is provided to a respective UE by a Serving Gateway (S-GW) and a Packet Data Network (PDN) Gateway (P-GW) through a radio access network (i.e., Evolved Universal Terrestrial Radio Access Network (E-UTRAN)) including a base station (i.e., eNB). The MBMS bearer service is provided to a group of UEs by a Broadcast Multicast Service Center (BM-SC) and an MBMS Gateway (MBMS GW) through the E-UTRAN.

CITATION LIST

Non Patent Literature

Non-Patent Literature 1: 3GPP TS 23.468 V13.3.0 (2015-12) "3rd Generation Partnership Project; Technical Specification Group Services and System Aspects; Group Communication System Enablers for LTE (GCSE_LTE); Stage 2 (Release 13)", December 2015

SUMMARY OF INVENTION

Technical Problem

The inventor has studied use of a public (commercial) LTE infrastructure to improve a connectivity of PS devices by complementing a coverage of PS-LTE. A Mobile Virtual Network Operator (MVNO) approach is used in an embodiment. Specifically, the PS-LTE network borrows a part of the infrastructure of a Mobile Network Operator (MNO) to communicate with PS devices through the network of the MNO.

As is well known, there are several types of MVNOs, and they differ in that they manage different subsets of the various elements for providing communication services. In other words, the several types of MVNOs differ in a boundary between an MVNO network and an MNO network. The boundary between the MVNO network and the MNO network is referred to as a point of interconnection (POI) or a point of interface (POI). Although the types of MVNOs are not defined clearly, in one MVNO model, a POI between the MNO and the MVNO is provided between a P-GW in the MNO infrastructure and an external node (e.g., an IP router) in the MVNO infrastructure. Such an MVNO model is referred to as, for example, a (Enhanced) Service Provider, a Thin MVNO, a Light MVNO, a Middle MBNO, or a layer 3 connection model. In another MVNO model, a POI between the MNO and the MVNO is provided between an S-GW in the MNO infrastructure and a P-GW in the MVNO infrastructure. Such an MVNO model is referred to as, for example, a Thick MVNO, a Full MVNO, or a layer 2 connection model.

FIG. 3 shows an example of a connection between a PS-LTE network (i.e., an MVNO network) and a commercial LTE network (i.e., an MNO network). In the example of FIG. 3, the P-GW in the PS-LTE network is connected to the S-GW in the commercial LTE network. That is, FIG. 3 shows an MVNO model referred to as a Thick MVNO, a Full MVNO, a layer 2 connection model, or the like.

In the example of FIG. 3, the GCS AS in PS-LTE selects an MBMS bearer service or dedicated EPS bearer services to deliver application signaling and data to a group of UEs. When the GCS AS selects the MBMS bearer service to be used, the GCS AS uses the BM-SC and the MBMS GW in the PS-LTE network to send application signaling and data. In contrast, when the GCS AS selects the dedicated EPS bearer services to be used, the GCS AS sends, to the P-GW in PS-LTE, IP packets which contain transmission data and are destined for respective UEs. To transmit packets to each UE, the P-GW in PS-LTE selects whether to use an EPS bearer through the PS-LTE network or an EPS bearer through the commercial LTE network.

However, in the example of FIG. 3, a selection between multicast transmission and unicast transmission is made independently from a selection between use of the PS-LTE network and use of the commercial LTE network. It may not be sufficiently efficient for these two selections to be made independently from each other. For example, when reachability to destination UEs through the commercial LTE network is high, it may be preferred that the distribution path using the commercial LTE network be preferentially selected rather than the two other distribution paths using the PS-LTE network. In another example, when a traffic volume passing through the POI is sufficiently lower than a predetermined upper limit on the transmission rate, it may be preferred that the distribution path using the commercial LTE network be preferentially selected rather than the other two distribution paths using the PS-LTE network. The transmission rate upper limit at the POI is determined by agreement between the MVNO (i.e., the PS-LTE operator) and the MNO.

Accordingly, one of the objects to be attained by embodiments disclosed herein is to provide an apparatus, a method, and a program that contribute to improving efficiency or appropriateness of a selection between multicast transmission and unicast transmission and a selection between use of a PS-LTE network and use of a commercial LTE network. It should be noted that this object is merely one of the objects to be attained by the embodiments disclosed herein. Other objects or problems and novel features will be apparent from the following description and the accompanying drawings.

Solution to Problem

In an aspect, as shown in FIG. 4, a P-GW 401 in PS-LTE includes a line selecting/switching unit 402. The configuration shown in FIG. 4 corresponds to the above-described MVNO model referred to as a Thick MVNO, a Full MVNO, a layer 2 connection model, or the like. The line selecting/switching unit 402 integrated with the P-GW 401, which is shown in FIG. 4, is configured to select between multicast transmission and unicast transmission as similar to the GCS AS. In other words, the P-GW 401 shown in FIG. 4 is configured to make both a selection between multicast transmission and unicast transmission and a selection between use of a PS-LTE network and use of a commercial LTE network.

For example, the P-GW 401 shown in FIG. 4 can first select between use of a PS-LTE network and use of a commercial LTE network, and upon selecting the use of the PS-LTE network, it can then select between multicast transmission and unicast transmission. Alternatively, the P-GW 401 shown in FIG. 4 can simultaneously select between multicast transmission and unicast transmission and a selection between use of a PS-LTE network and use of a commercial LTE network while taking into account states of three distribution paths.

In an aspect, a line selecting/switching unit 502 which is separated from a P-GW 501 of PS-LTE may be provided as shown in FIG. 5. A configuration shown in FIG. 5 corresponds to the above-described MVNO model referred to as a (Enhanced) Service Provider, a Thin MVNO, a Light MVNO, a Middle MBNO, a layer 3 connection model, or the like. The line selecting/switching unit 502 shown in FIG. 5 is configured to make both a selection between multicast transmission and unicast transmission and a selection between use of a PS-LTE network and use of a commercial LTE network.

For example, the line selecting/switching unit 502 shown in FIG. 5 can first select between use of a PS-LTE network and use of a commercial LTE network, and upon selecting the use of the PS-LTE network, it can then select between multicast transmission and unicast transmission. Alternatively, the line selecting/switching unit 502 shown in FIG. 5 can simultaneously make a selection between multicast transmission and unicast transmission and a selection between use of a PS-LTE network and use of a commercial LTE network while taking into account states of three distribution paths.

In an aspect, a line selecting/switching unit 602 (702) integrated with or separated from a P-GW 601 (701) may be provided as shown in FIGS. 6 and 7. Configurations shown in FIGS. 6 and 7 correspond to the above-described MVNO model referred to as a Thick MVNO, a Full MVNO, a layer 2 connection model, or the like. Like the line selecting/switching unit 502 shown in FIG. 5, the line selecting/switching unit 602 (702) shown in FIGS. 6 and 7 is configured to perform both of a selection between multicast transmission and unicast transmission and a selection between use of a PS-LTE network and use of a commercial LTE network.

The P-GW 601 (701) shown in FIGS. 6 and 7 distributes packets destined for UEs in accordance with a result of selecting a distribution path by the line selecting/switching unit 602 (702). Packets to be distributed through a multicast distribution path (an MBMS bearer service) are passed transparently through the P-GW 601 and sent to a BM-SC 703 (701). Meanwhile, packets to be distributed through a unicast distribution path (an EPS bearer service) traversing the commercial LTE network are passed transparently through the P-GW 601 and sent to an S-GW 704 in the commercial LTE network (701).

Advantageous Effects of Invention

According to the above-described aspects, it is possible to provide an apparatus, a method, and a program that contribute to improving efficiency or appropriateness of a selection between multicast transmission and unicast transmission and a selection between use of a PS-LTE network and use of a commercial LTE network.

DESCRIPTION OF EMBODIMENTS

Specific embodiments are described hereinafter in detail with reference to the drawings. The same or corresponding elements are denoted by the same symbols throughout the drawings, and duplicated explanations are omitted as necessary for the sake of clarity.

First Embodiment

Figure 1:
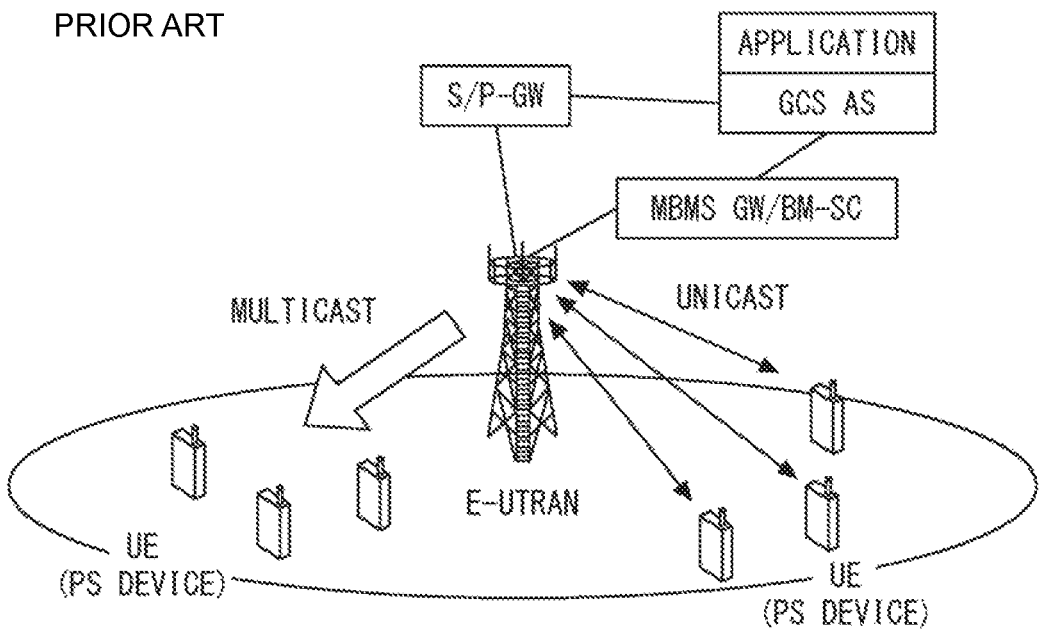
FIG. 1 shows an example of a PS-LTE network supporting group communication.
Figure 2:
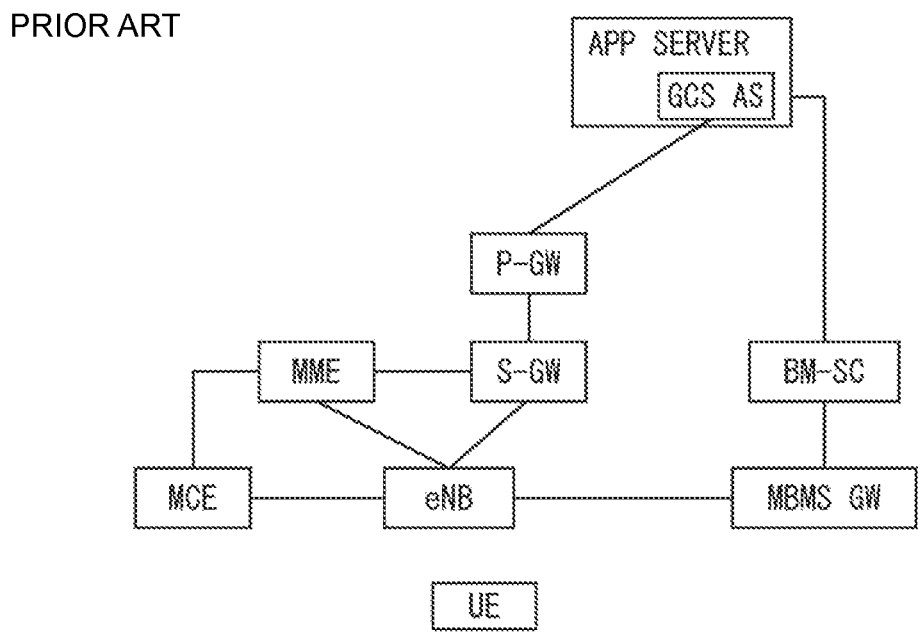
FIG. 2 shows an example of a PS-LTE network supporting group communication.
Figure 3:
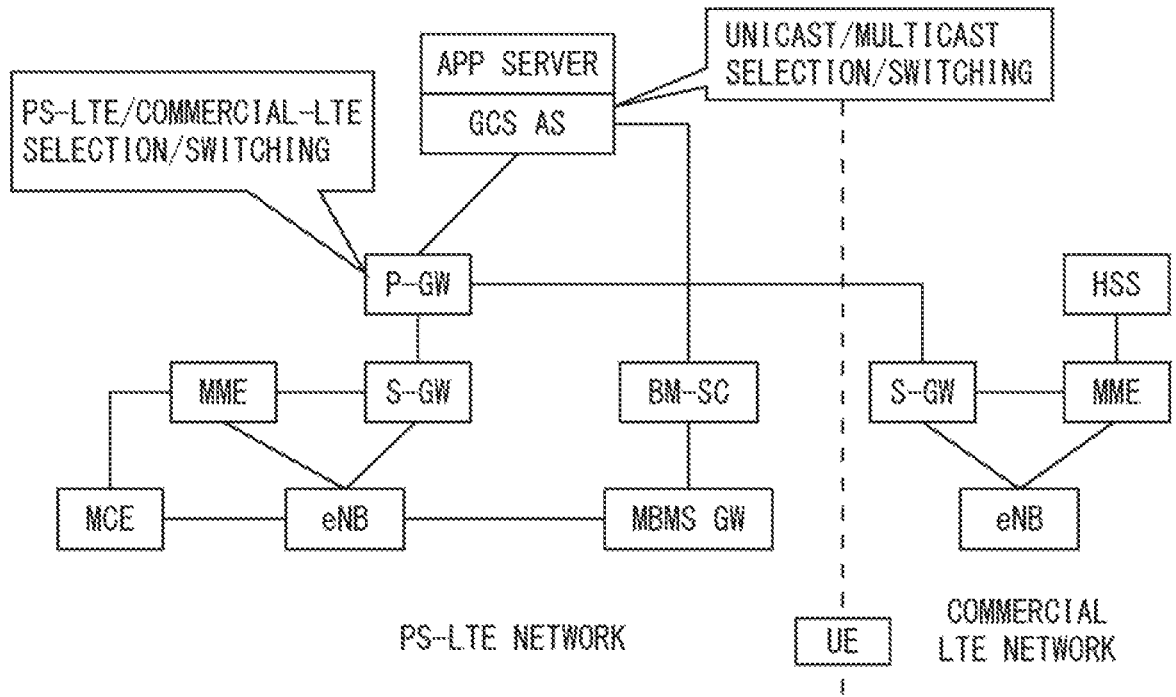
FIG. 3 shows an example of a connection between a PS-LTE network and a commercial LTE network.
Figure 4:
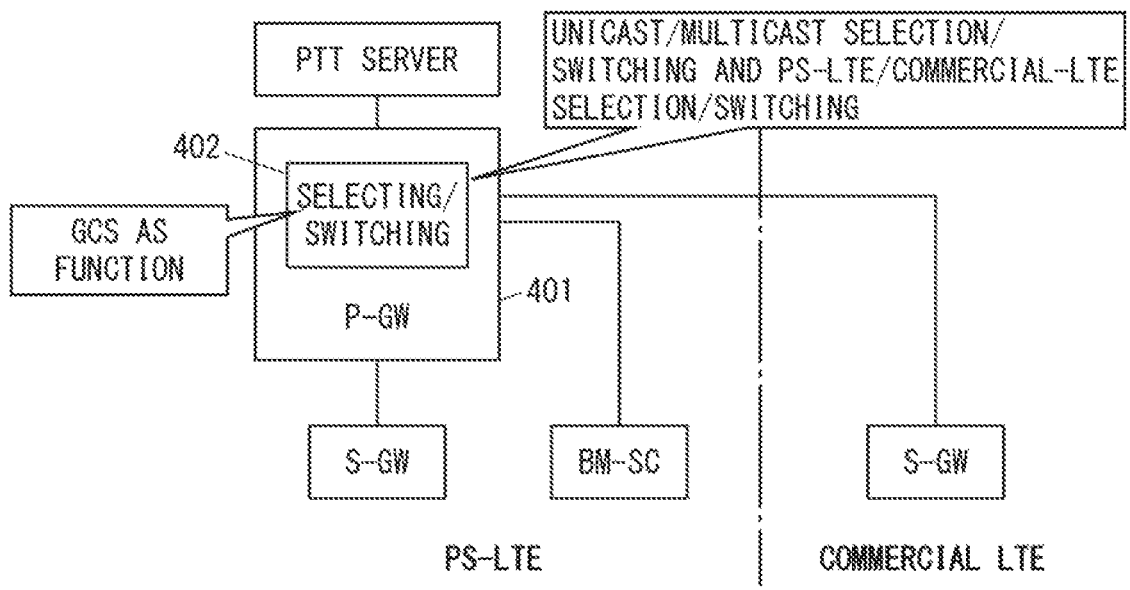
FIG. 4 shows a configuration example of an LTE system for a public safety network according to an embodiment.
Figure 8:
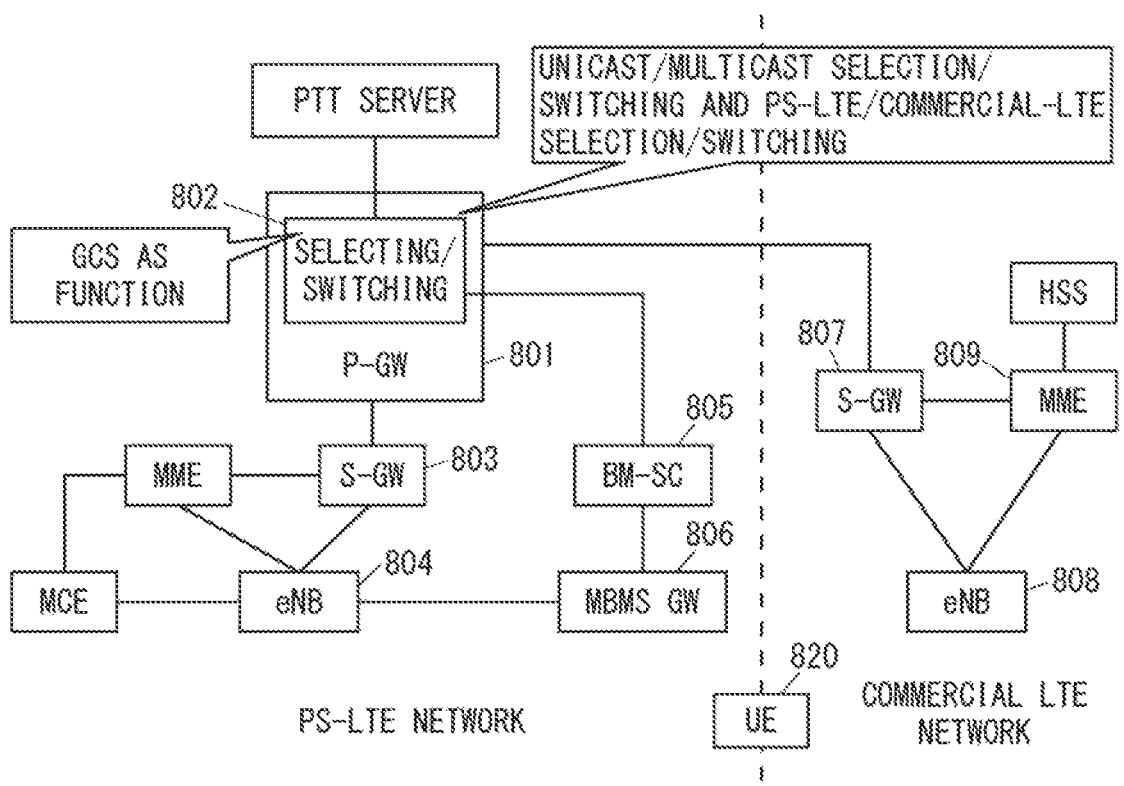
FIG. 8 shows a configuration example of an LTE system for a public safety network according to a first embodiment.

FIG. 8 shows an LTE system for the public safety network according to this embodiment. FIG. 8 corresponds to the MVNO model referred to as a Thick MVNO, a Full MVNO, a layer 2 connection model, or the like. FIG. 8 also corresponds to a configuration shown in FIG. 4. Specifically, in the example of FIG. 8, a P-GW 801 of PS-LTE includes a line selecting/switching unit 802. The line selecting/switching unit 802 is configured to select between multicast transmission and unicast transmission as similar to the GCS AS. In other words, the P-GW 801 shown in FIG. 8 is configured to make both a selection between multicast transmission and unicast transmission and a selection between use of a PS-LTE network and use of a commercial LTE network.

For example, the P-GW 801 integrated with the line selecting/switching unit 802 can first select between uses of the PS-LTE network and the commercial LTE network, and upon selecting the use of the PS-LTE network, it can then select between the multicast transmission and the unicast transmission. Alternatively, the P-GW 801 integrated with the line selecting/switching unit 802 can simultaneously make a selection between the multicast transmission and the unicast transmission and a selection between use of the PS-LTE network and use of the commercial LTE network while taking into account states of three distribution paths.

Accordingly, the P-GW 801 integrated with the line selecting/switching unit 802 according to this embodiment can contribute to improving efficiency or appropriateness of a selection between the multicast transmission and the unicast transmission and a selection between use of the PS-LTE network and the commercial LTE network.

Figure 9:
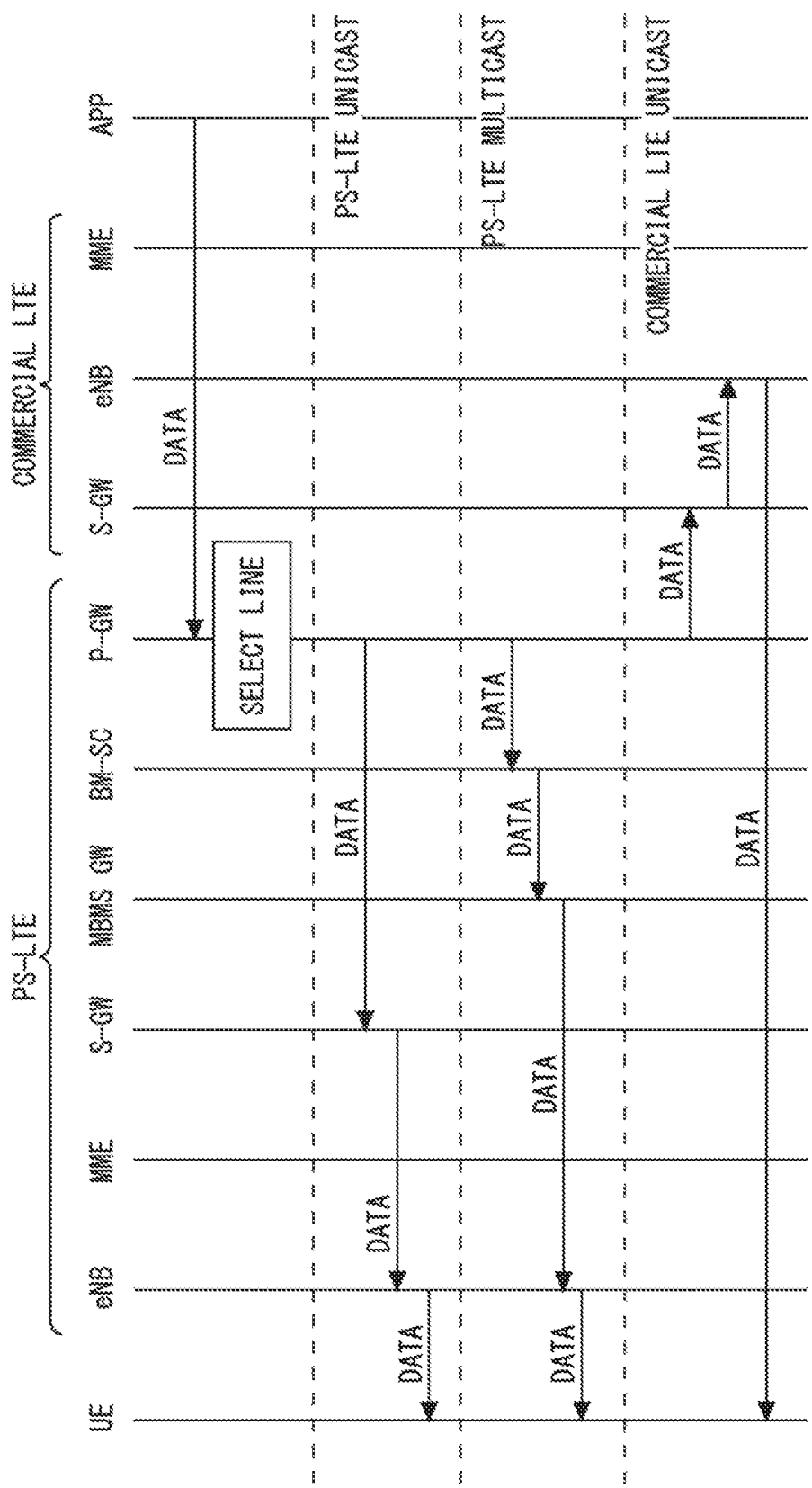
FIG. 9 is a sequence diagram showing an example of data distribution according to the first embodiment.

FIG. 9 is a sequence diagram showing an example of data distribution to a PS device (i.e., UE) 820 according to this embodiment. The P-GW 801 integrated with the line selecting/switching unit 802 makes a line selection upon receiving data from an application server (App). The line selection includes selecting one or more suitable paths among three distribution paths, that is, PS-LTE unicast, PS-LTE multicast, and commercial LTE unicast.

Upon selecting the PS-LTE unicast, the P-GW 801 integrated with the line selecting/switching unit 802 sends data to the UE through an S-GW 803 and an eNB 804 in the PS-LTE network. Upon selecting the PS-LTE multicast, the P-GW 801 integrated with the line selecting/switching unit 802 sends data to the UE through a BM-SC 805 and an MBMS GW 806 in the PS-LTE network. Upon selecting the commercial LTE unicast, the P-GW 801 integrated with the line selecting/switching unit 802 sends data to the UE through an S-GW 807 and an eNB 808 in the commercial LTE network.

In this embodiment, the UE 820 may be equipped with a plurality of communication modems, use a plurality of SIM cards for the PS-LTE network and the commercial LTE network, and configured to be connected simultaneously to the PS-LTE network and the commercial LTE network. Alternatively, the UE 820 may be configured to be connected selectively to either the PS-LTE network or the commercial LTE network.

Figure 10:
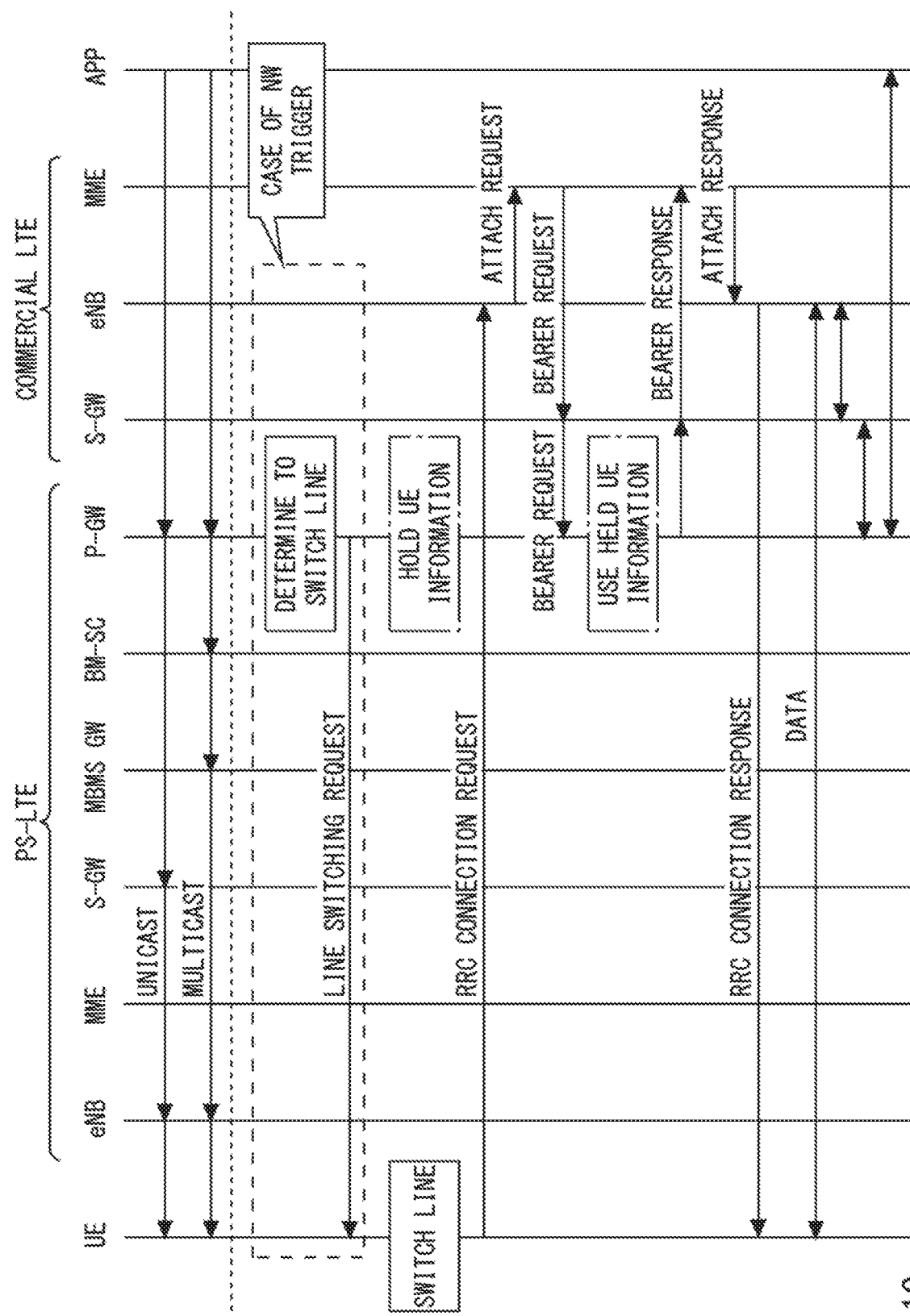
FIG. 10 is a sequence diagram showing an example of a procedure for switching networks according to the first embodiment.
Figure 11:
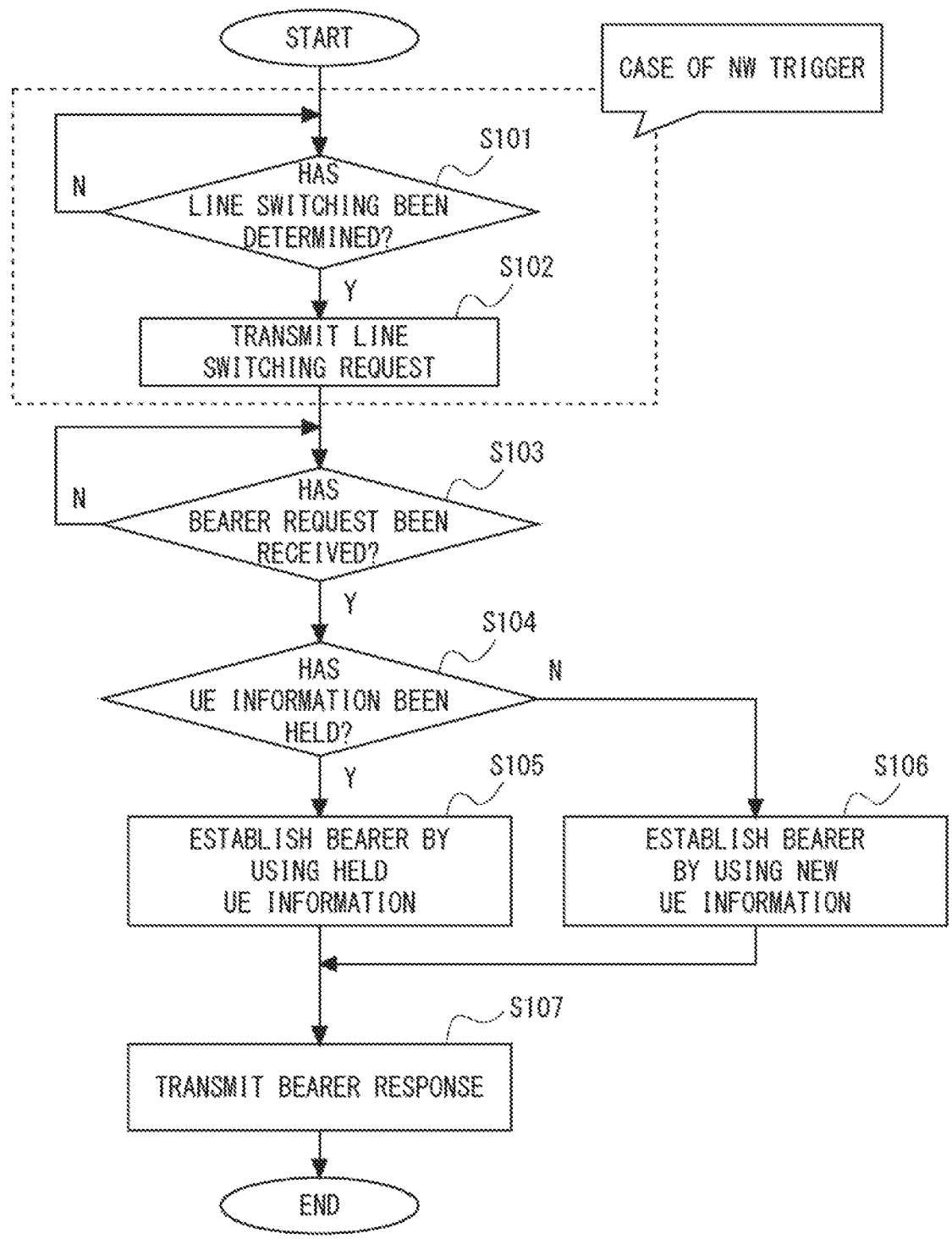
FIG. 11 shows an example of an operation performed by a P-GW in the procedure for switching networks according to the first embodiment.
Figure 12:
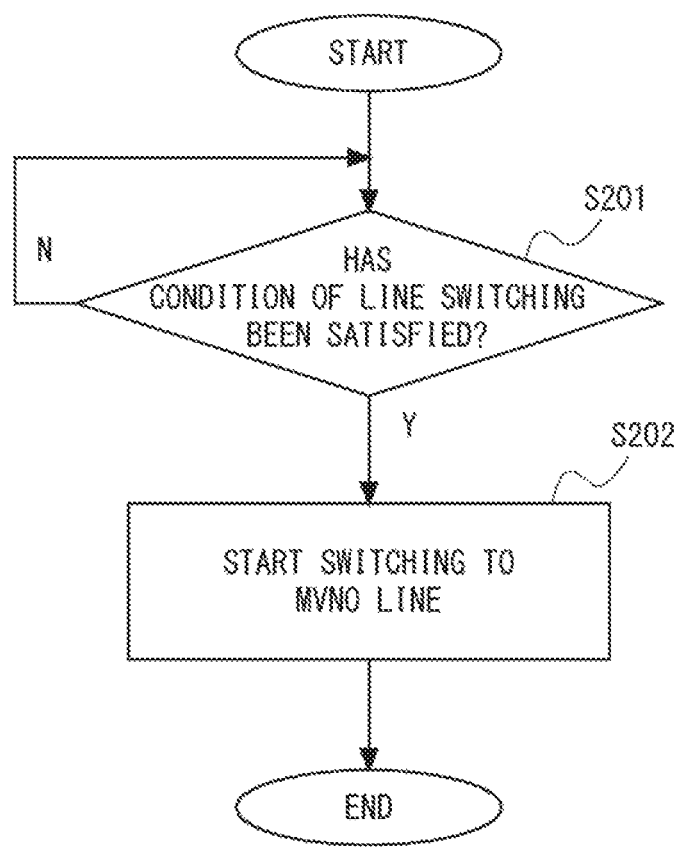
FIG. 12 shows an example of an operation performed by an UE in the procedure for switching networks according to the first embodiment.

The following describes a procedure for switching from data distribution using the PS-LTE network to data distribution using the commercial LTE network. FIG. 10 is a sequence diagram showing an example of such a switching procedure. FIGS. 11 and 12 show an operation performed by the P-GW 801, which is integrated with the line selecting/switching unit 802, and an operation performed by the UE 820 in the procedure shown in FIG. 10, respectively.

Steps S101 and S102 shown in FIG. 11 are carried out when the network triggers line switching. In Step S101 shown in FIG. 11, the P-GW 801 determines whether to switch from data distribution using the PS-LTE network to data distribution using the commercial LTE network.

In some implementations, the P-GW 801 may consider the size of data transmitted to the UE 820 or the size of data received from the UE 820 to select a suitable line (i.e., a data distribution path). For example, the P-GW 801 may switch to data distribution using the commercial LTE network when the transmission data size or the received data size exceeds a predetermined threshold.

In some implementations, the P-GW 801 may consider a usage rate of an MVNO line to select a suitable line (i.e., a data distribution path). The usage rate of the MVNO line may be defined as a ratio to the agreed upper limit of the transmission rate on the POI. For example, the P-GW 801 may switch to data distribution using the commercial LTE network when a usage rate of the MVNO line is lower than a predetermined threshold.

In Step S102, the P-GW 801 transmits a line switching request to the UE 820 through the PS-LTE network. The line switching request may be a message of an application layer.

In Step S103, the P-GW 801 determines whether it has received a bearer request (i.e., a session request or a Create Session Request) message from the S-GW 807 in the commercial LTE network. The session request is triggered by an attach procedure initiated by the UE 820 to attach to the commercial LTE network upon receiving the line switching request. Specifically, the UE 820 transmits a connection request (i.e., an RRC Connection Request) message to the commercial LTE network, the UE next requests a network attachment to an MME 809 in the commercial LTE network, the MME 809 then requests the S-GW 807 in the commercial LTE network to generate an EPS bearer for the UE, and after that the S-GW 807 sends a bearer request to the P-GW 801.

In Step S104, the P-GW 801 determines whether it has already held UE information corresponding to an UE identifier (e.g., an IMSI) contained in the session request. When the P-GW 801 has held the UE information (YES in Step S104), it uses the held UE information to establish a bearer with the S-GW 807 in the commercial LTE network (Step S105). Specifically, the UE information may include an IP address of the UE 820. The P-GW 801 may continue to use the same IP address as the one assigned to the UE 820 when the UE 820 is connected to the PS-LTE network, for a bearer of the commercial LTE network. When the P-GW 801 has not held the UE information (NO in Step S104), it uses new UE information (e.g., an IP address) to establish a bearer with the S-GW 807 in the commercial LTE network (Step S106).

In step S107, the P-GW 801 sends a bearer response (i.e., a session response or a Create Session Response) message to the S-GW 807 in the commercial LTE network.

In step S201 shown in FIG. 12, the UE 820 determines whether it has satisfied a condition for line switching from the PS-LTE network to the commercial LTE network. In some implementations, the condition for line switching may be receiving a line switching request from the network (e.g., the P-GW 801 integrated with the line selecting/switching unit 802). In some implementations, the condition for line switching may be that received power from the eNB 804 in the PS-LTE network is lower than a predetermined threshold. In some implementations, the condition for line switching may be that received power from the eNB 808 in the commercial LTE network exceeds a predetermined threshold. In some implementations, the condition for line switching may be that a usage rate of the MVNO line is lower than a predetermined threshold.

In Step S202, the UE 820 starts a procedure for switching to the commercial LTE network. As shown in FIG. 10, the UE 820 may send a connection request (i.e., an RRC Connection Request) massage to the commercial LTE network to request a network attachment thereto.

Figure 13:
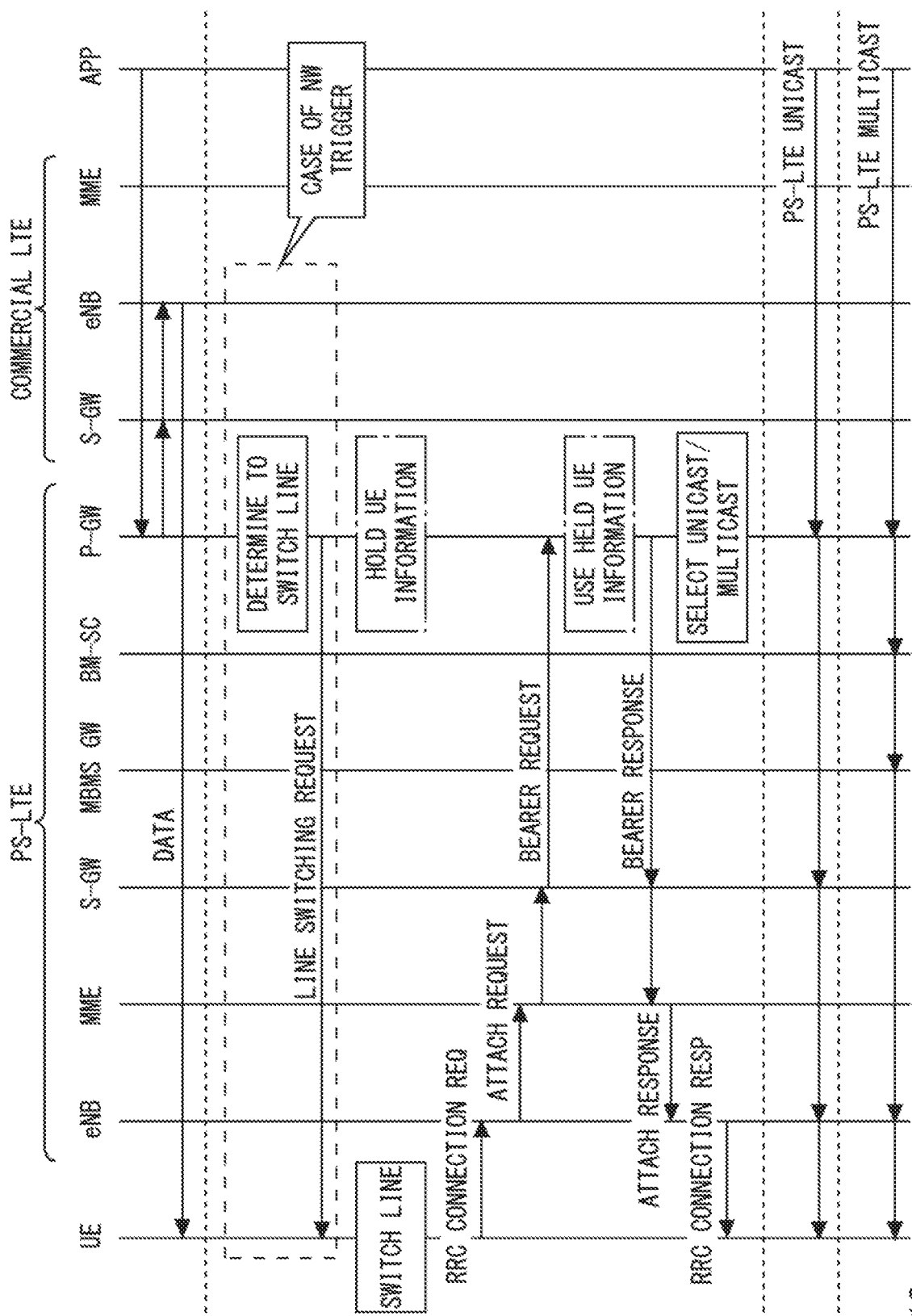
FIG. 13 is a sequence diagram showing an example of the procedure for switching networks according to the first embodiment.
Figure 14:
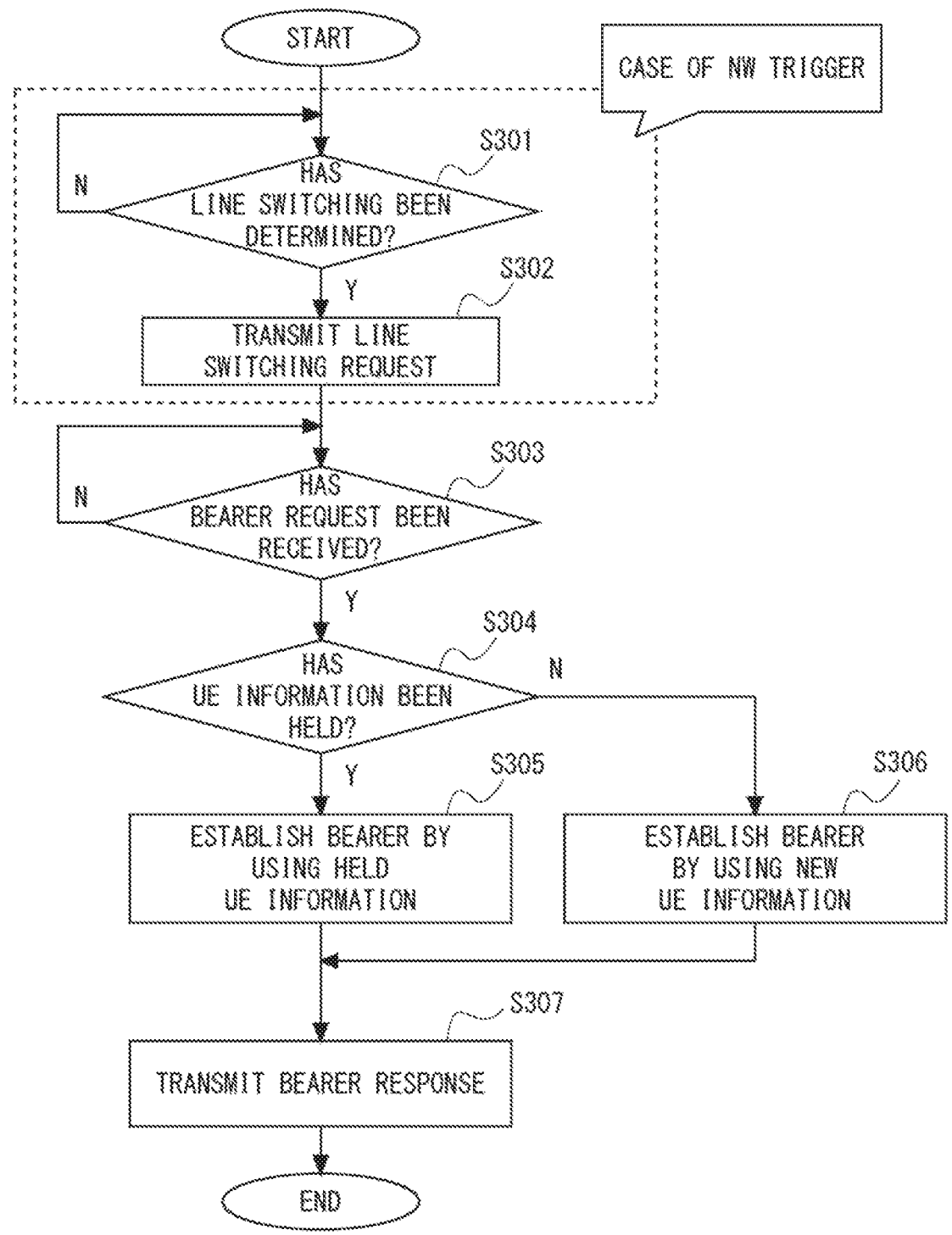
FIG. 14 shows an example of an operation performed by the P-GW in the procedure for switching networks according to the first embodiment.
Figure 15:
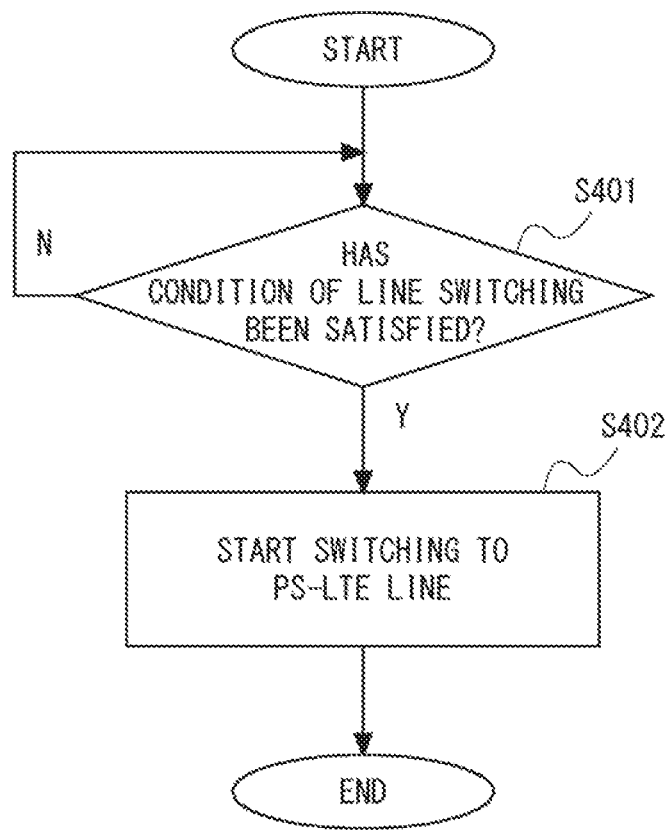
FIG. 15 shows an example of an operation performed by the UE in the procedure for switching networks according to the first embodiment.

The following describes a procedure for switching from data distribution using the commercial LTE network to data distribution using the PS-LTE network. FIG. 13 is a sequence diagram showing an example of such a switching procedure. FIGS. 14 and 15 show an operation performed by the P-GW 801 (which is integrated with the line selecting/switching unit 802) and an operation performed by the UE 820 in the procedure shown in FIG. 10, respectively.

The procedures shown in FIGS. 13 to 15 and the operations of the P-GW 801 and the UE 820 shown in FIGS. 13 to 15 are basically the same as those shown in FIGS. 10 to 12, and thus duplicated explanations thereof are omitted.

A determination condition of line switching in Step S301 may be opposite to that used in Step S101. For example, the P-GW 801 may switch to data distribution using the PS-LTE network when the transmission data size or the received data size is lower than a predetermined threshold. For example, the P-GW 801 may switch to data distribution using the PS-LTE network when a usage rate of the MVNO line exceeds a predetermined threshold.

A determination condition of line switching in Step S401 may be opposite to that used in Step S201. For example, the UE 820 may determine to switch to the PS-LTE network when received power from the eNB 804 in the PS-LTE network exceeds a predetermined threshold. For example, the UE 820 may determine to switch to the PS-LTE network when received power from the eNB 808 in the commercial LTE network is lower than a predetermined threshold.

Second Embodiment

Figure 5:
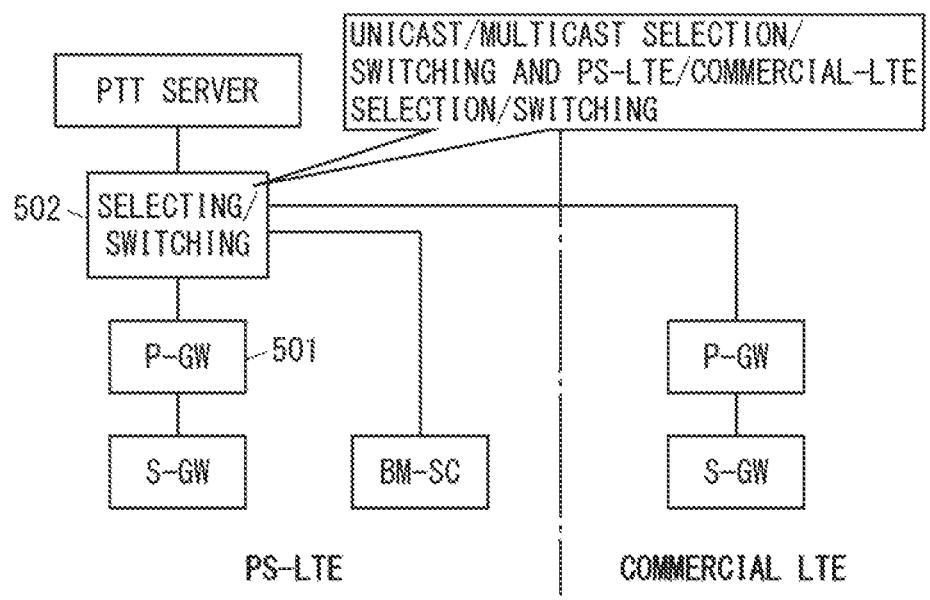
FIG. 5 shows a configuration example of an LTE system for a public safety network according to an embodiment.
Figure 16:
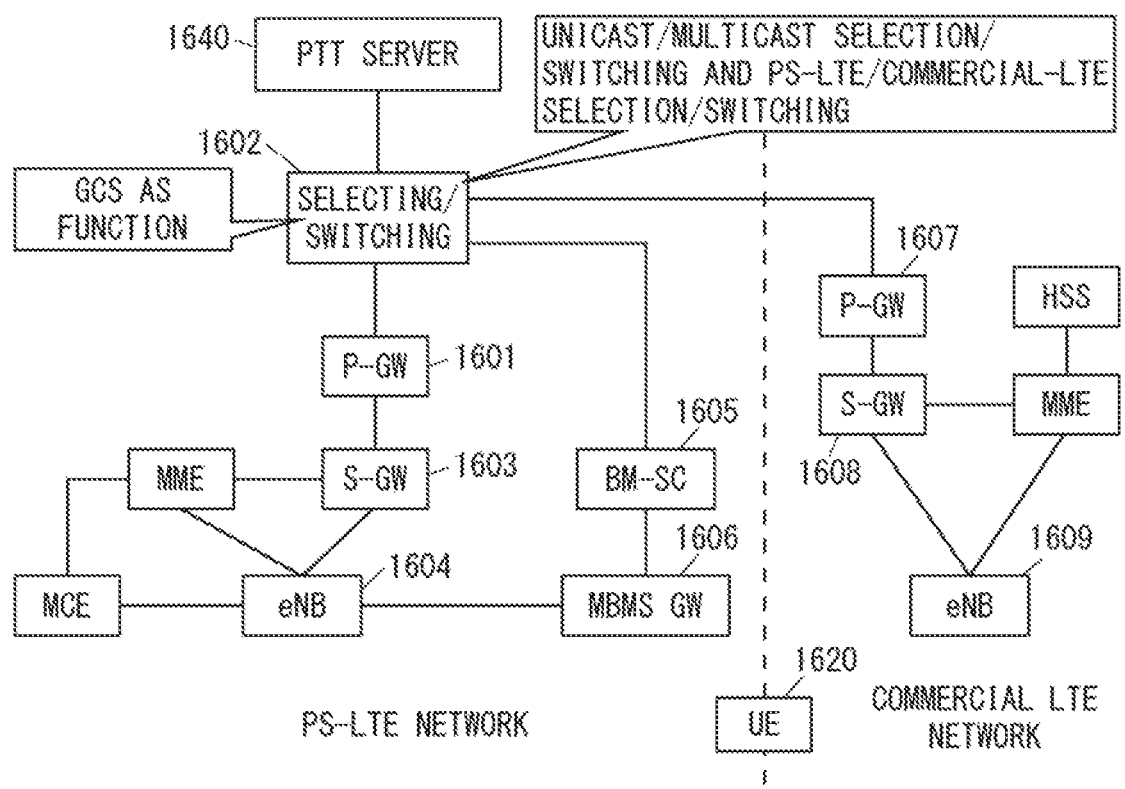
FIG. 16 shows a configuration example of an LTE system for a public safety network according to a second embodiment.

FIG. 16 shows a configuration example of an LTE system for a public safety network according to this embodiment. FIG. 16 corresponds to the MVNO model referred to as a Thick MVNO, a Full MVNO, a layer 2 connection model, or the like. FIG. 16 also corresponds to a configuration shown in FIG. 5. Specifically, in the example of FIG. 16, a line selecting/switching unit 1602 is placed between an application server (e.g., PTT Server) 1640 and a P-GW 1601 in the PS-LTE network. The line selecting/switching unit 1602 can first select between use of a PS-LTE network and use of a commercial LTE network, and upon selecting the use of the PST-LTE network, it can then select between multicast transmission and unicast transmission. Alternatively, the line selecting/switching unit 1602 can simultaneously make a selection between multicast transmission and unicast transmission and a selection between use of a PS-LTE network and use of a commercial LTE network while taking into account states of three distribution paths.

Accordingly, the line selecting/switching unit 1602 according to this embodiment can contribute to improving efficiency or appropriateness of a selection between multicast transmission and unicast transmission and a selection between use of a PS-LTE network and use of a commercial LTE network.

Figure 17:
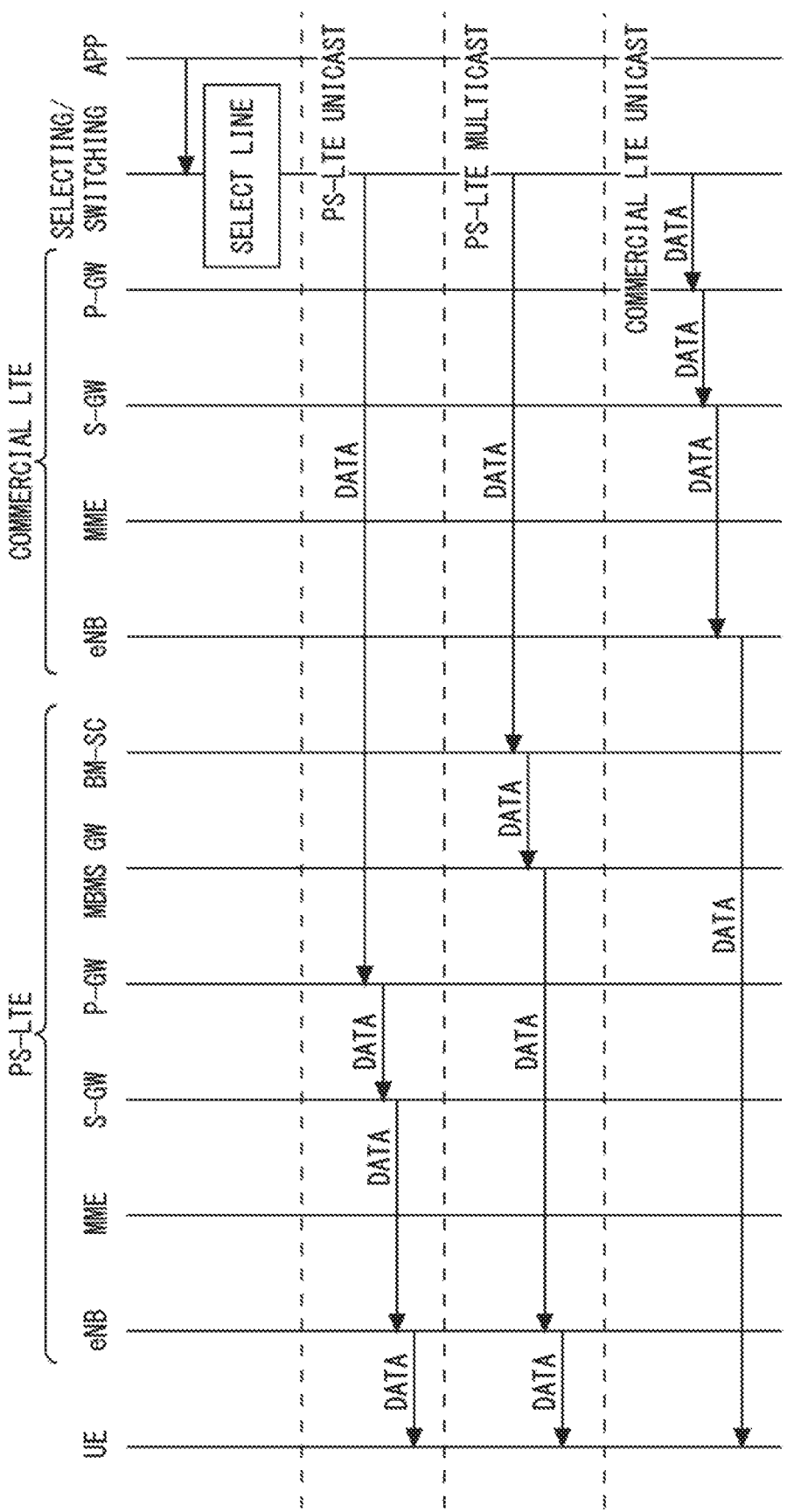
FIG. 17 is a sequence diagram showing an example of data distribution according to the second embodiment.

FIG. 17 is a sequence diagram showing an example of data distribution to a PS device (i.e., an UE) 1620 according to this embodiment. The line selecting/switching unit 1602 makes a line selection upon receiving data from the application server (App) 1640. The line selection includes selecting one or more suitable paths among three distribution paths, that is, PS-LTE unicast, PS-LTE multicast, and commercial LTE unicast.

Upon selecting the PS-LTE unicast, the line selecting/switching unit 1602 sends data to the UE through the P-GW 1601, an S-GW 1603, and an eNB 1604 in the PS-LTE network. Upon selecting the PS-LTE multicast, the line selecting/switching unit 1602 sends data to the UE through a BM-SC 1605 and an MBMS GW 1606 in the PS-LTE network. Upon selecting the commercial LTE unicast, the line selecting/switching unit 1602 sends data to the UE 1620 through an P-GW 1607, an S-GW 1608, and an eNB 1609 in the commercial LTE network.

Figure 18:
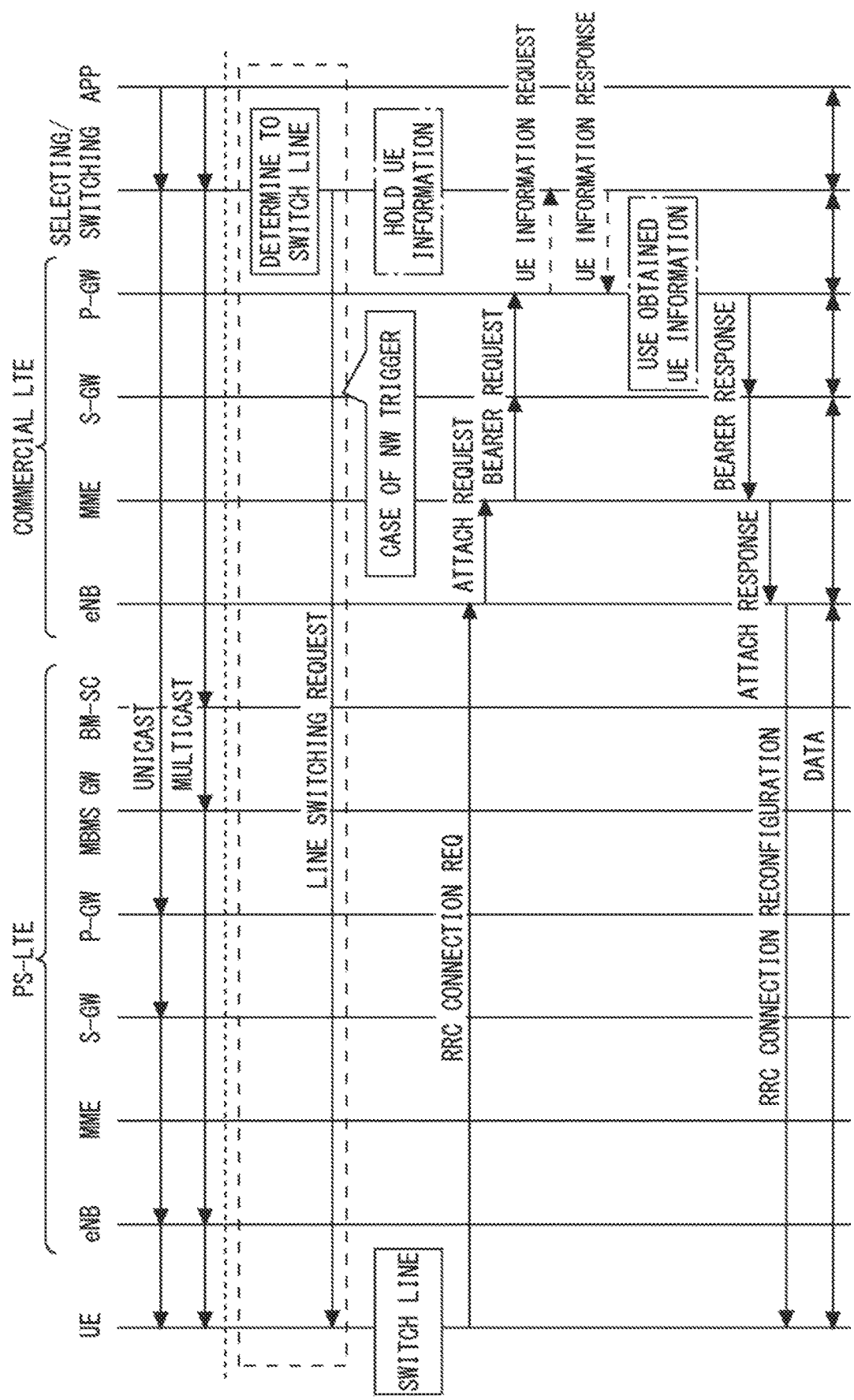
FIG. 18 is a sequence diagram showing an example of the procedure for switching networks according to the second embodiment.
Figure 19:
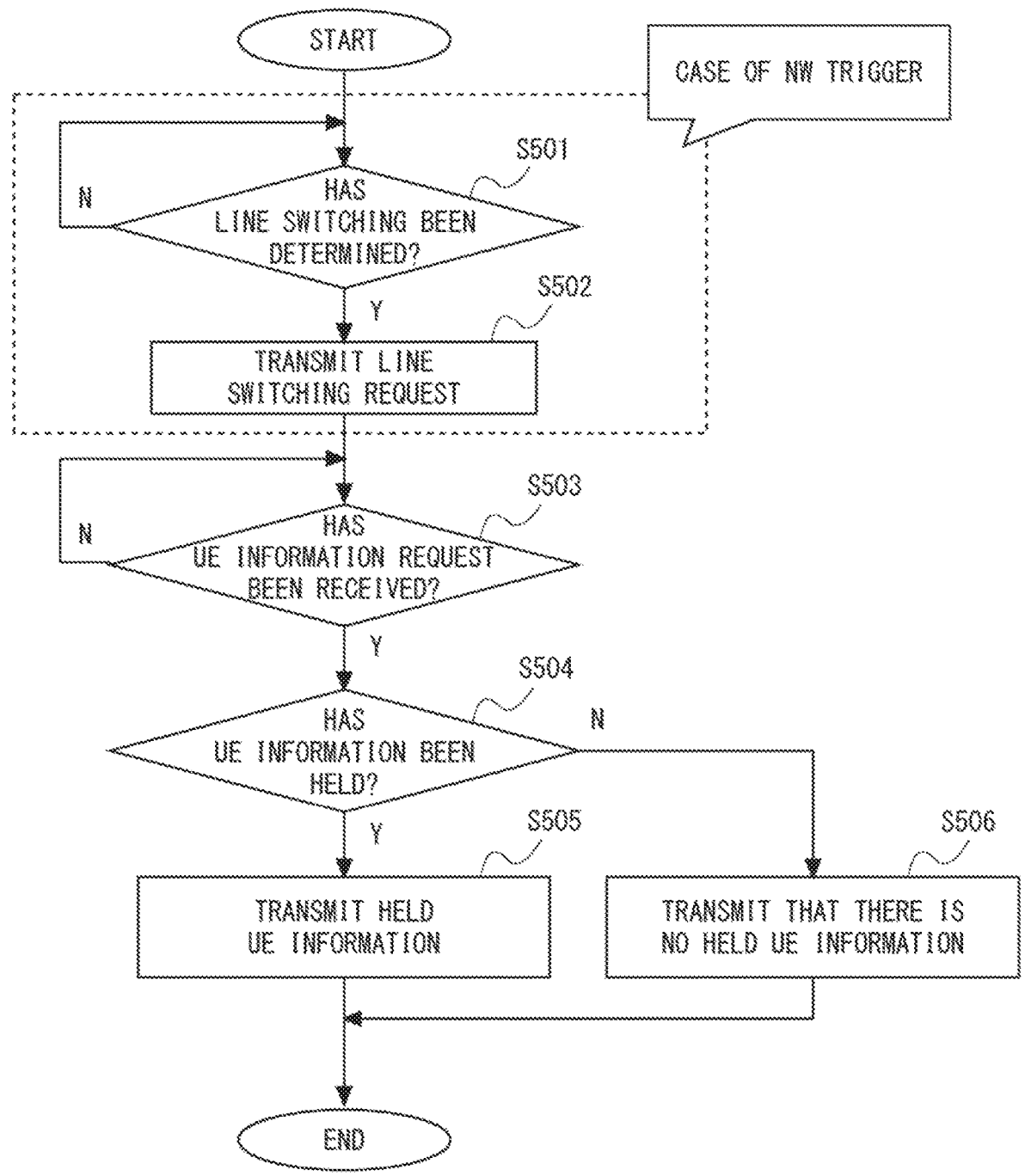
FIG. 19 shows an example of an operation performed by a P-GW in the procedure for switching networks according to the second embodiment.
Figure 20:
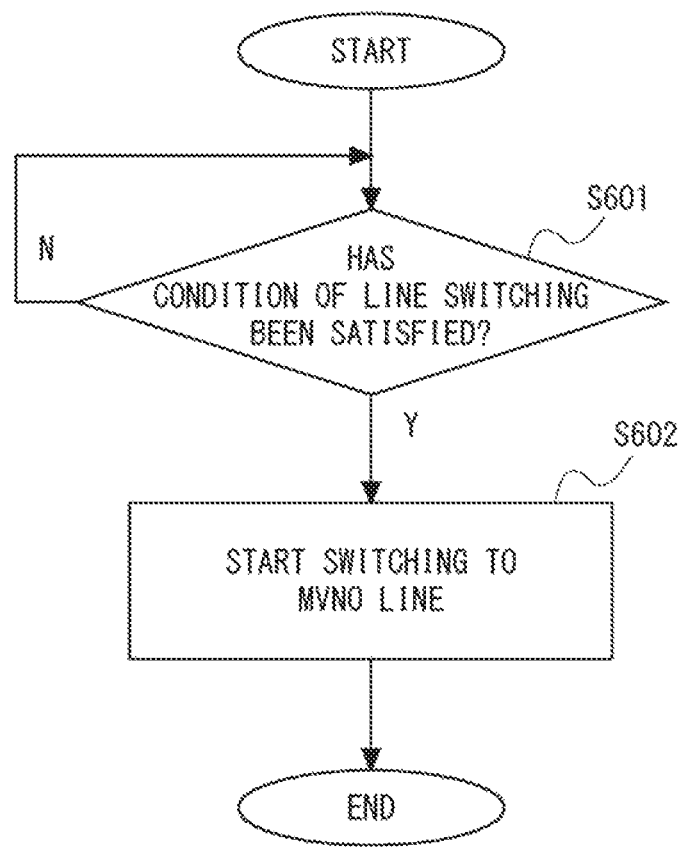
FIG. 20 shows an example of an operation performed by an UE in the procedure for switching networks according to the second embodiment.

The following describes a procedure for switching from data distribution using the PS-LTE network to data distribution using the commercial LTE network. FIG. 18 is a sequence diagram showing an example of such a switching procedure. FIGS. 19 and 20 show an operation performed by the line selecting/switching unit 1602 and an operation performed by the UE 1620 in the procedure shown in FIG. 18, respectively.

The processes in Steps S501 and S502 shown in FIG. 19 are similar to those in Steps S101 and S102 shown in FIG. 11.

In Step S503, the line selecting/switching unit 1602 determines whether it has received an UE information request message from the P-GW 1607 in the commercial LTE network.

In Step S504, the line selecting/switching unit 1602 determines whether it has already held UE information corresponding to an UE identifier (e.g., an IMSI) contained in the UE information request message. When the line selecting/switching unit 1602 has held the UE information (YES in Step S504), it supplies the held UE information to the P-GW 1607 in the commercial LTE network (Step S505). When the line selecting/switching unit 1602 has not held the UE information (NO in Step S504), it notifies to the P-GW 1607 in the commercial LTE network that it has not held the valid UE information (Step S506).

The operations of the UE 1620 shown in FIG. 20 are basically the same as those of the UE 820 shown in FIG. 12, and thus duplicated explanation thereof is omitted.

Figure 21:
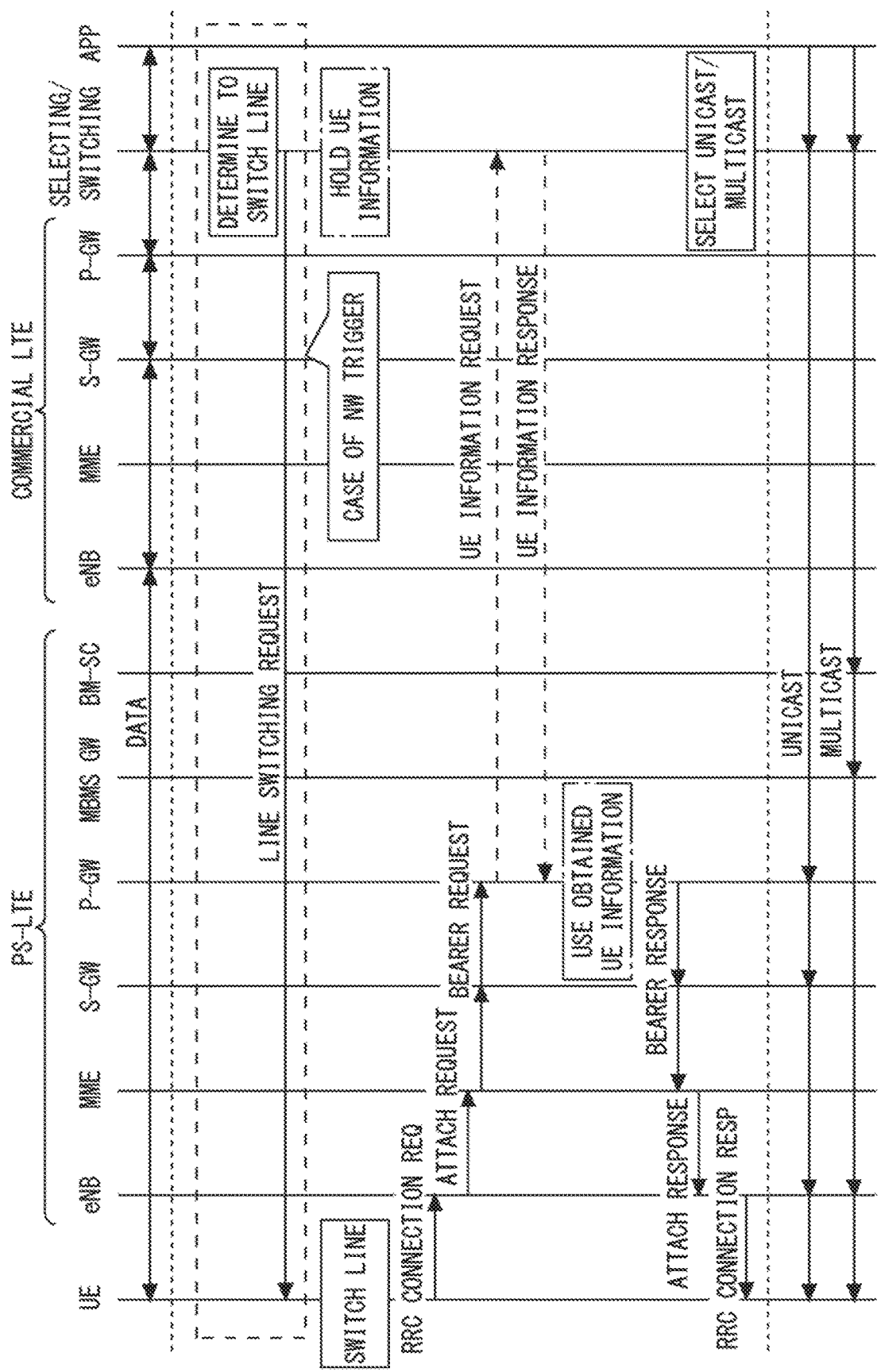
FIG. 21 is a sequence diagram showing an example of the procedure for switching networks according to the second embodiment.
Figure 22:
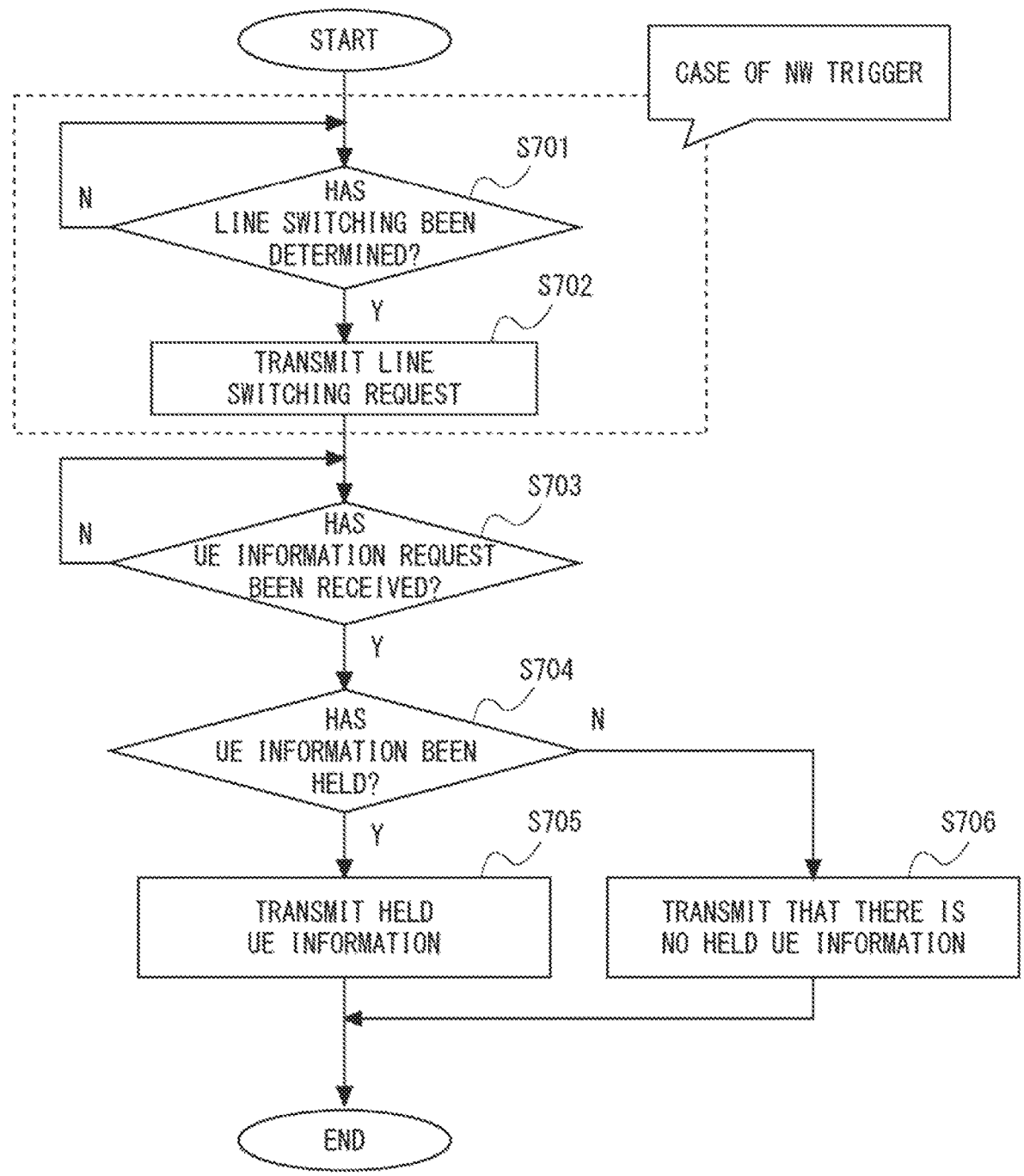
FIG. 22 shows an example of an operation performed by the P-GW in the procedure for switching networks according to the second embodiment.
Figure 23:
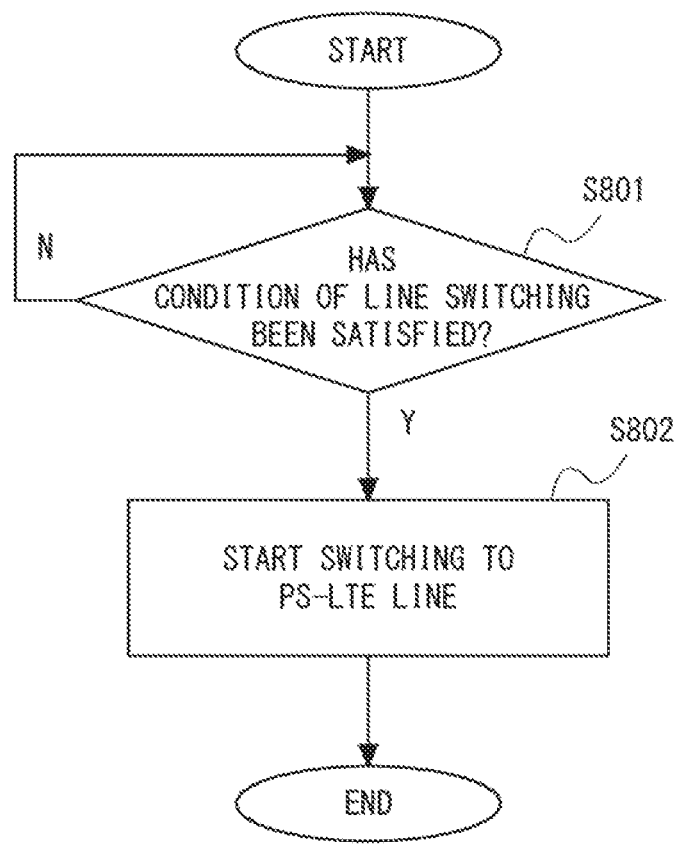
FIG. 23 shows an example of an operation performed by the UE in the procedure for switching networks according to the second embodiment.

The following describes a procedure for switching from data distribution using the commercial LTE network to data distribution using the PS-LTE network. FIG. 21 is a sequence diagram showing an example of the switching procedure. FIGS. 22 and 23 show an operation performed by the line selecting/switching unit 1602 and an operation performed by the UE 1620 in the procedure shown in FIG. 21, respectively.

The procedures shown in FIGS. 21 to 23 and the operations of the line selecting/switching unit 1602 and the UE 1620 shown in FIGS. 21 to 23 are basically the same as those shown in FIGS. 18 to 20, and thus duplicated explanations thereof are omitted. A determination condition of line switching in Step S701 may be opposite to that used in Step S501. Similarly, a determination condition of line switching in Step S801 may be a determination condition opposite to that used in Step S601.

Third Embodiment

Figure 6:
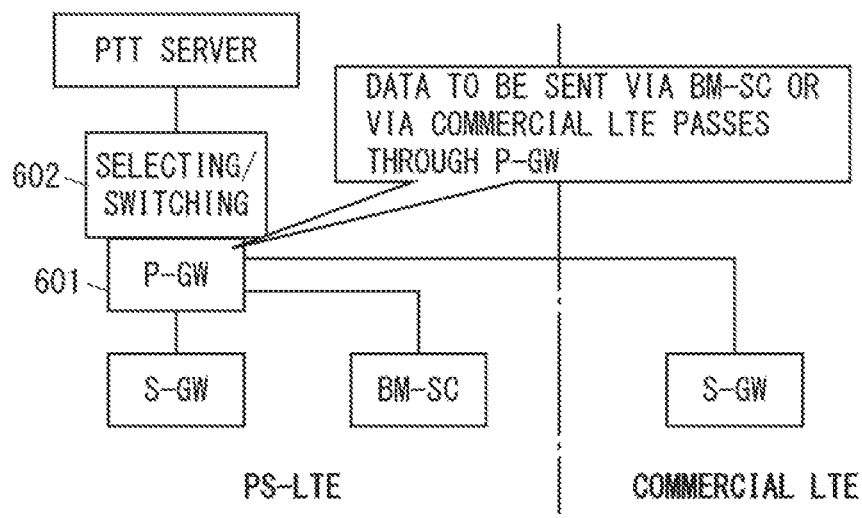
FIG. 6 shows a configuration example of an LTE system for a public safety network according to an embodiment.
Figure 7:
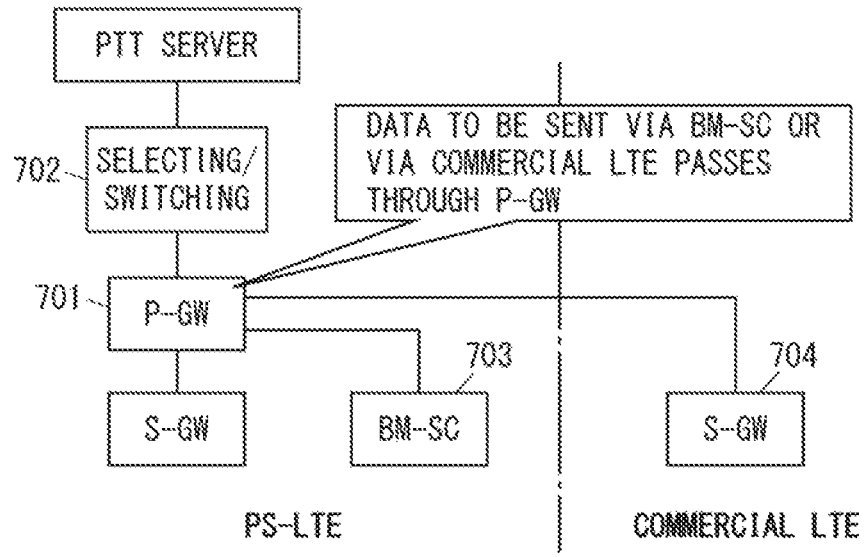
FIG. 7 shows a configuration example of an LTE system for a public safety network according to an embodiment.
Figure 24:
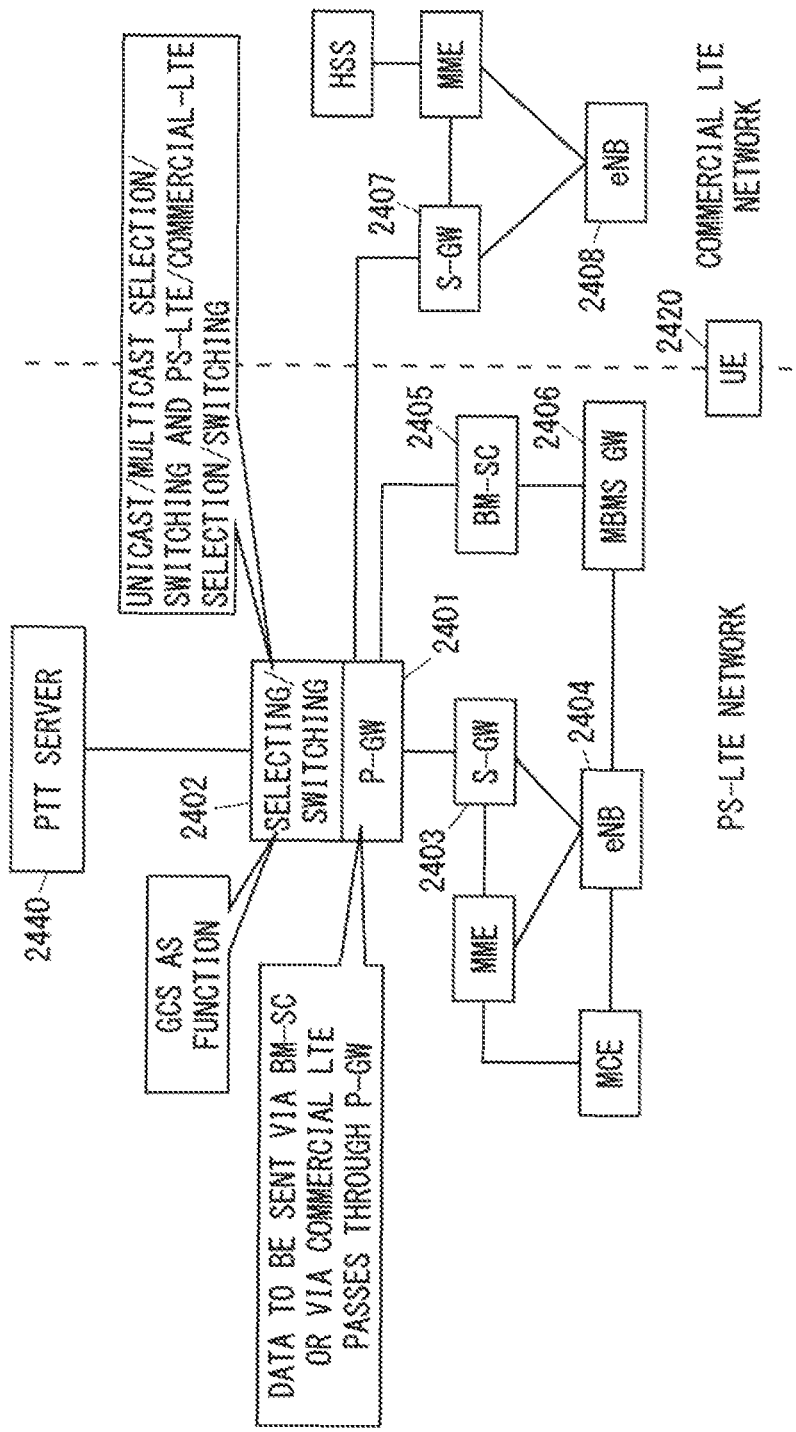
FIG. 24 shows a configuration example of an LTE system for a public safety network according to a third embodiment.

FIG. 24 shows a configuration example of an LTE system for a public safety network according to this embodiment. FIG. 24 corresponds to the MVNO model referred to as a Thick MVNO, a Full MVNO, a layer 2 connection model, or the like. FIG. 24 also corresponds to configurations shown in FIGS. 6 and 7. Specifically, in the example of FIG. 24, a line selecting/switching unit 2402 is placed between an application server (e.g., a PTT Server) 2440 and a P-GW 2401 in the PS-LTE network. The line selecting/switching unit 2402 shown in FIG. 24 is configured to make both a selection between multicast transmission and unicast transmission and a selection between use of a PS-LTE network and use of a commercial LTE network. The line selecting/switching unit can first select between use of the PS-LTE network and use of the commercial LTE network, and upon selecting the use of the PS-LTE network, it can then select between the multicast transmission and the unicast transmission. Alternatively, the line selecting/switching unit can simultaneously make a selection between the multicast transmission and the unicast transmission and a selection between use of the PS-LTE network and use of the commercial LTE network while taking into account states of three distribution paths.

Accordingly, the line selecting/switching unit 2402 according to this embodiment can contribute to improving efficiency or appropriateness of a selection between the multicast transmission and the unicast transmission and a selection between use of the PS-LTE network and use of the commercial LTE network.

Note that the P-GW 2401 shown in FIG. 24 distributes packets destined for UEs in accordance with the result of selecting a distribution path by the line selecting/switching unit 2402. Packets to be distributed through a multicast distribution path (an MBMS bearer service) are passed transparently through the P-GW 2401 and sent to a BM-SC 2405. Meanwhile, packets to be distributed through a unicast distribution path (EPS bearer services) traversing the commercial LTE network are passed transparently through the P-GW 2401 and sent to an S-GW 2407 in the commercial LTE network.

Figure 25:
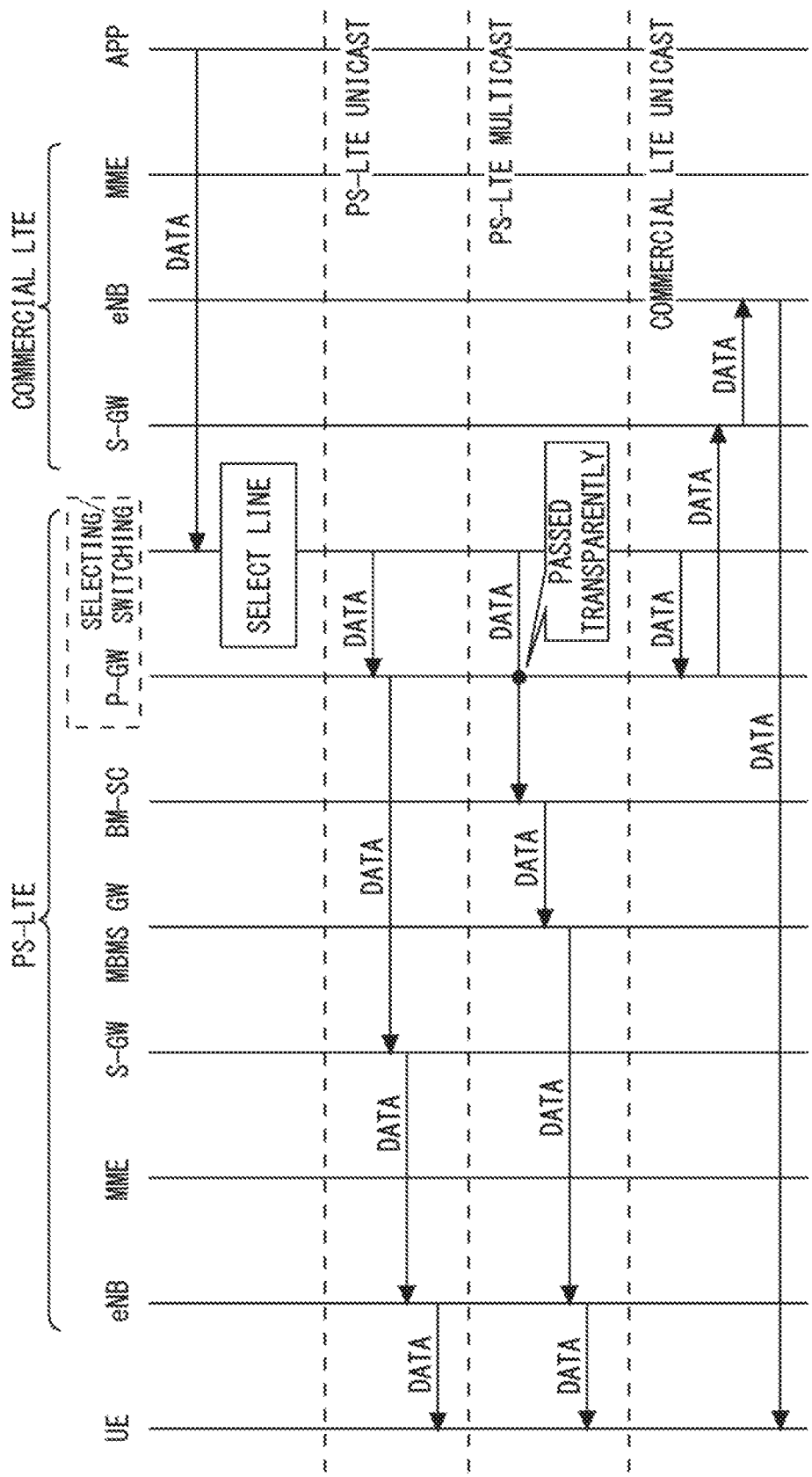
FIG. 25 is a sequence diagram showing an example of data distribution according to the third embodiment.

FIG. 25 is a sequence diagram showing an example of data distribution to a PS device (i.e., an UE) according to this embodiment. The line selecting/switching unit 2402 makes a line selection upon receiving data from the application server (App) 2440. The line selection includes selecting one or more suitable paths among three distribution paths, that is, PS-LTE unicast, PS-LTE multicast, and commercial LTE unicast.

Upon selecting the PS-LTE unicast, the line selecting/switching unit 2402 sends data to an UE 2420 through the P-GW 2401, an S-GW 2403 and an eNB 2404 in the PS-LTE network. Upon selecting the PS-LTE multicast, the line selecting/switching unit 2402 sends data to the UE 2420 through the BM-SC 2405 and an MBMS GW 2406 in the PS-LTE network. As described earlier, the packets to be sent to the BM-SC 2405 pass transparently through the P-GW 2401. Upon selecting the commercial LTE unicast, the line selecting/switching unit 2402 sends data to the UE 2420 through the S-GW 2407 and an eNB 2408 in the commercial LTE network.

Figure 26:
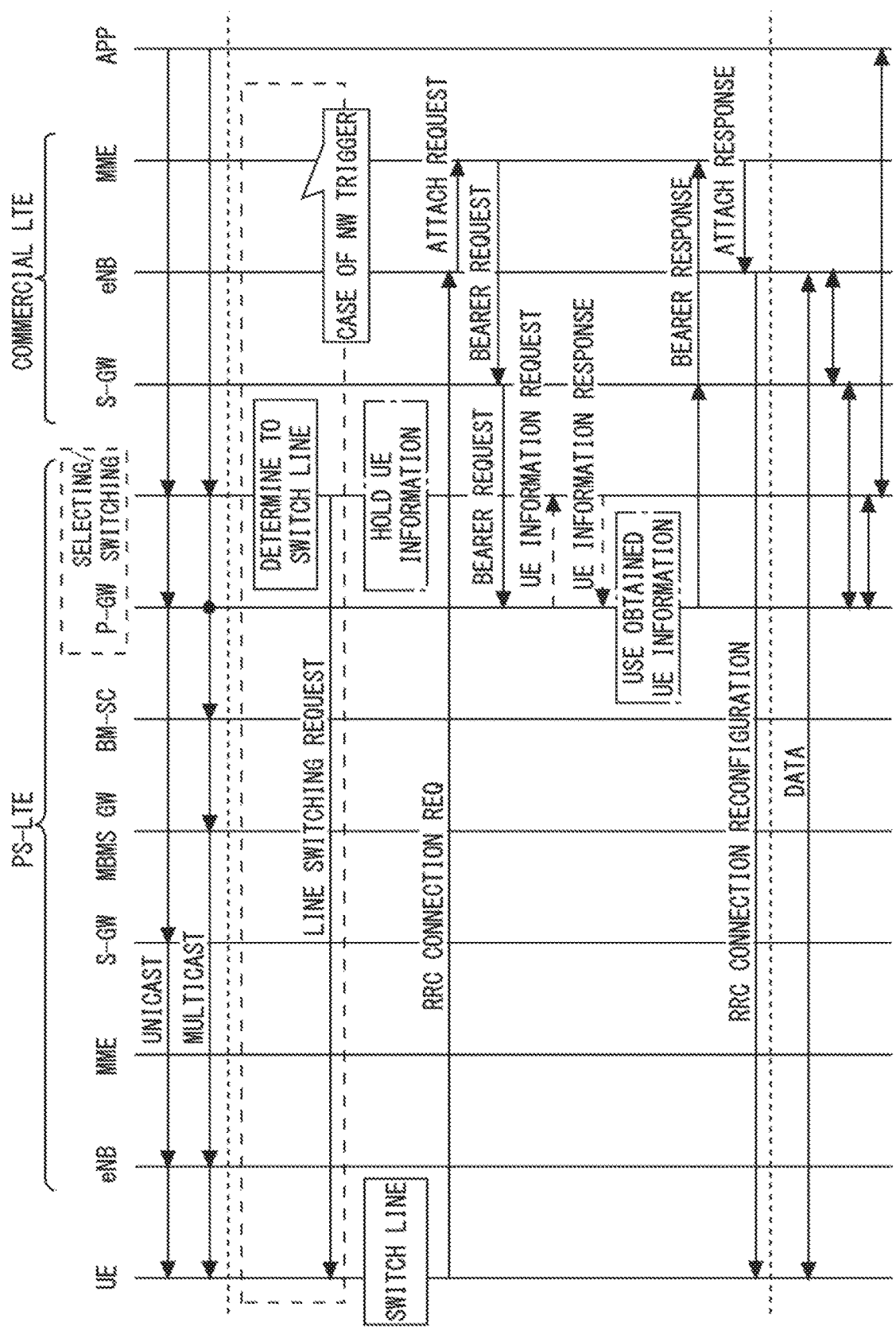
FIG. 26 is a sequence diagram showing an example of the procedure for switching networks according to the third embodiment.
Figure 27:
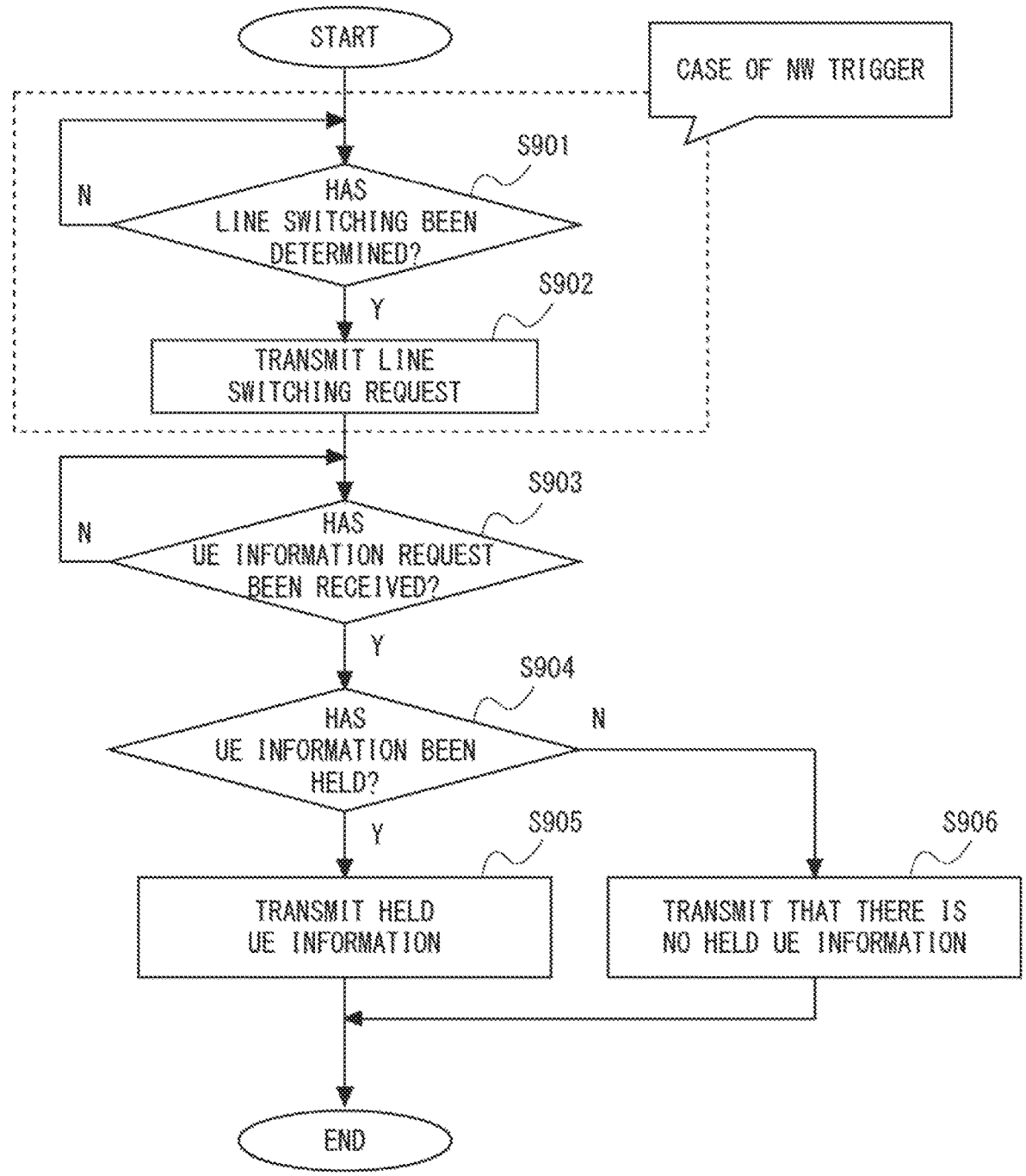
FIG. 27 shows an example of an operation performed by a P-GW in the procedure for switching networks according to the third embodiment.
Figure 28:
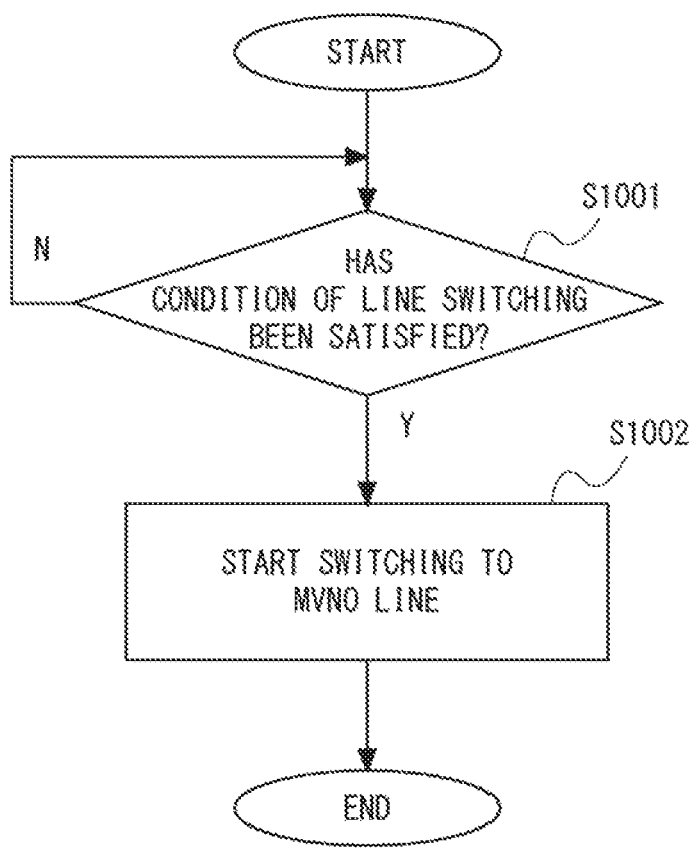
FIG. 28 shows an example of an operation performed by an UE in the procedure for switching networks according to the third embodiment.

The following describes a procedure for switching from data distribution using the PS-LTE network to data distribution using the commercial LTE network. FIG. 26 is a sequence diagram showing an example of such a switching procedure. FIGS. 27 and 28 show an operation performed by the line selecting/switching unit 2402 and an operation performed by the UE 2420 in the procedure shown in FIG. 26, respectively.

The processes in Steps S901 and S902 shown in FIG. 27 are similar to those in Steps S101 and S102 shown in FIG. 11 and those in Steps S501 and S502 shown in FIG. 19. Note that the line selecting/switching unit 2402 may acquire a usage rate of the MVNO line from the P-GW 2401 and use it to select a suitable line (i.e., a data distribution path). In other words, in a selection of a suitable line (i.e., a data distribution path), the line selecting/switching unit 2402 may use information or data obtained (measured) by the P-GW 2401. That is, the line selecting/switching unit 2402 may select a suitable line (i.e., a data distribution path) in cooperation with the P-GW 2401.

The processes in Steps S903 to S906 are basically the same as those in Steps S503 to S506 in FIG. 19. However, the line selecting/switching unit 2402 receives an UE information request message from the P-GW 2401 in the PS-LTE network (Step S903).

The operations of the UE 2420 shown in FIG. 28 is basically the same as those of the UE 820 (1620) shown in FIGS. 12 and 20, and thus duplicated explanation thereof is omitted.

Figure 29:
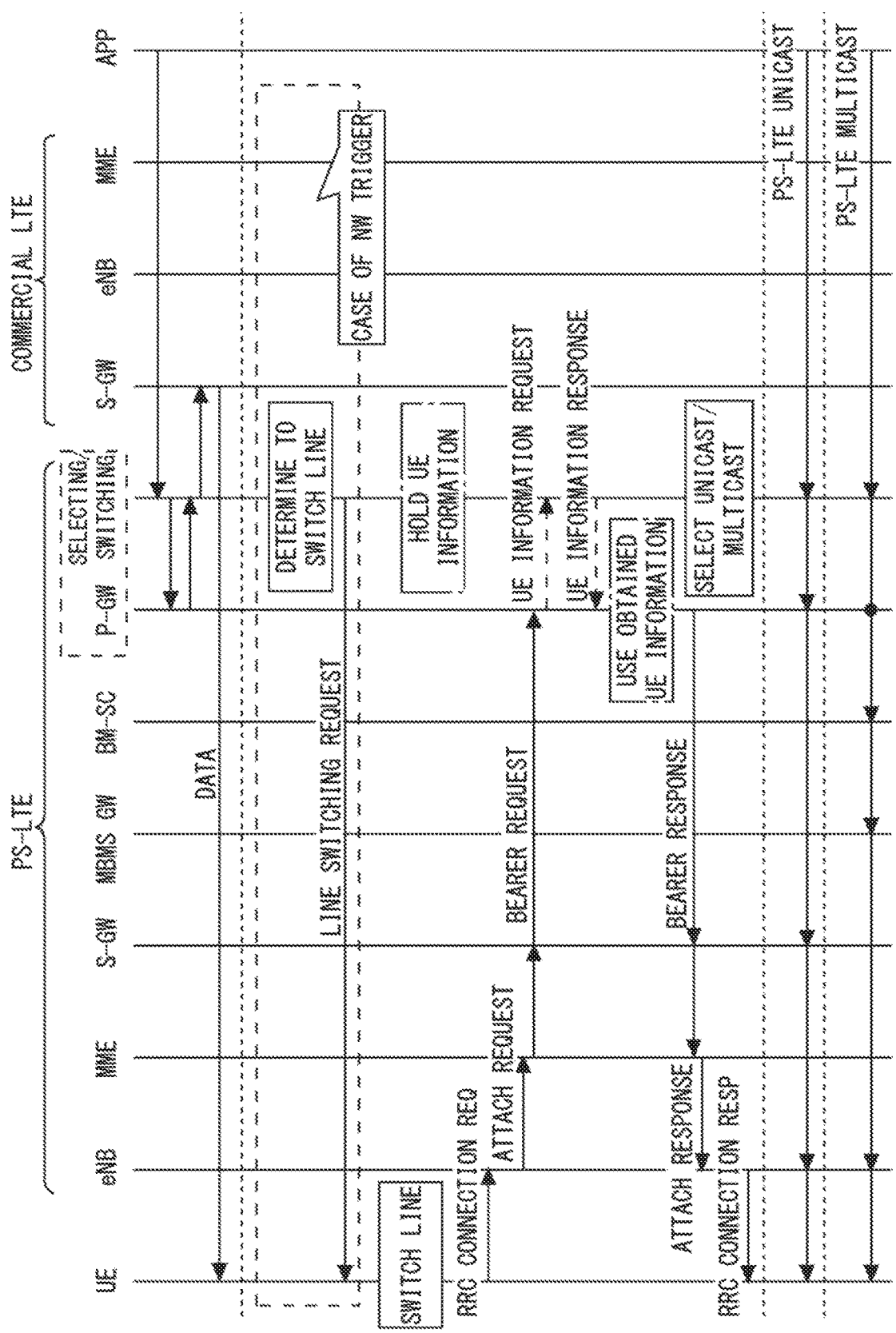
FIG. 29 is a sequence diagram showing an example of the procedure for switching networks according to the third embodiment.
Figure 30:
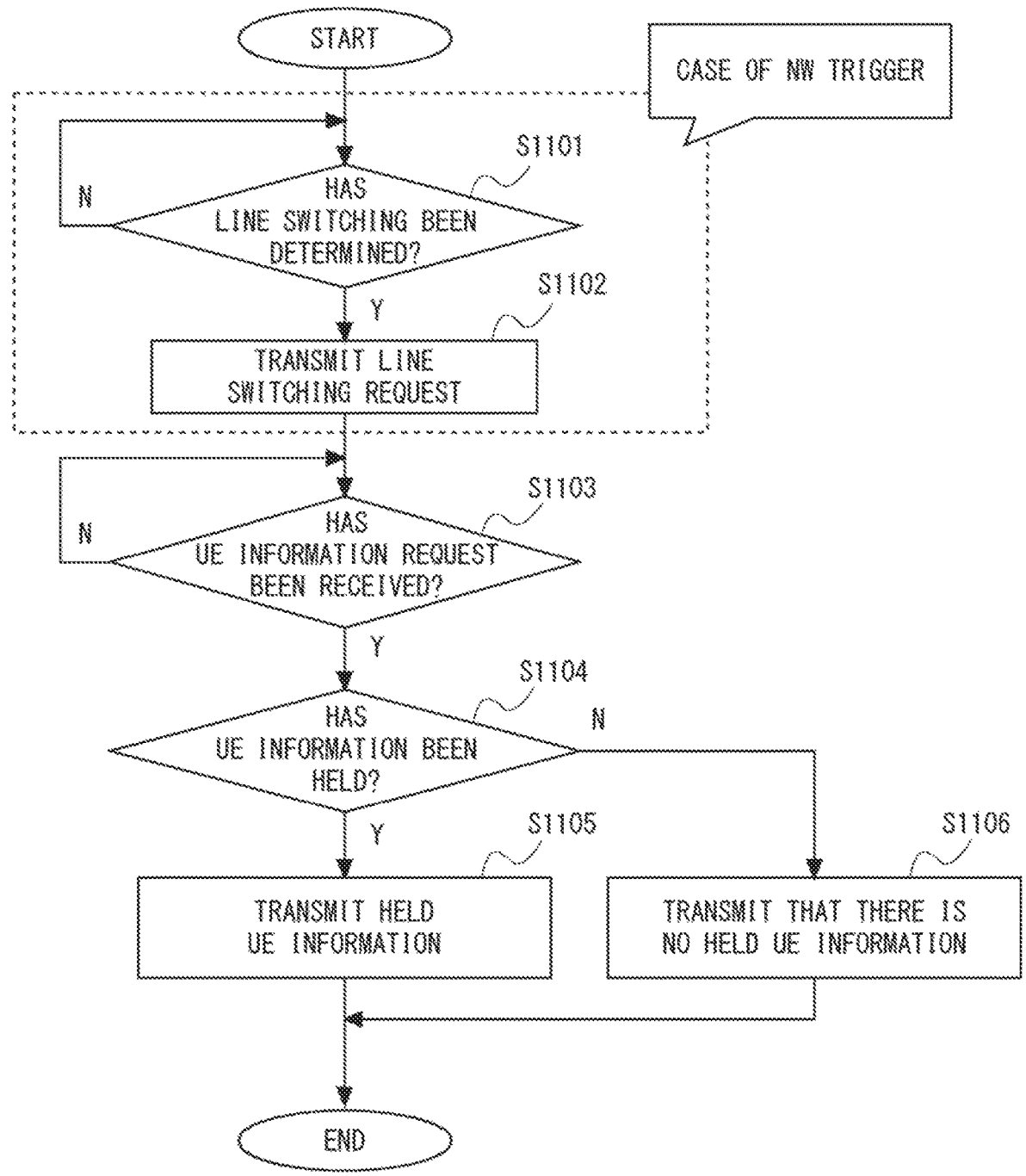
FIG. 30 shows an example of an operation performed by the P-GW in the procedure for switching networks according to the third embodiment.
Figure 31:
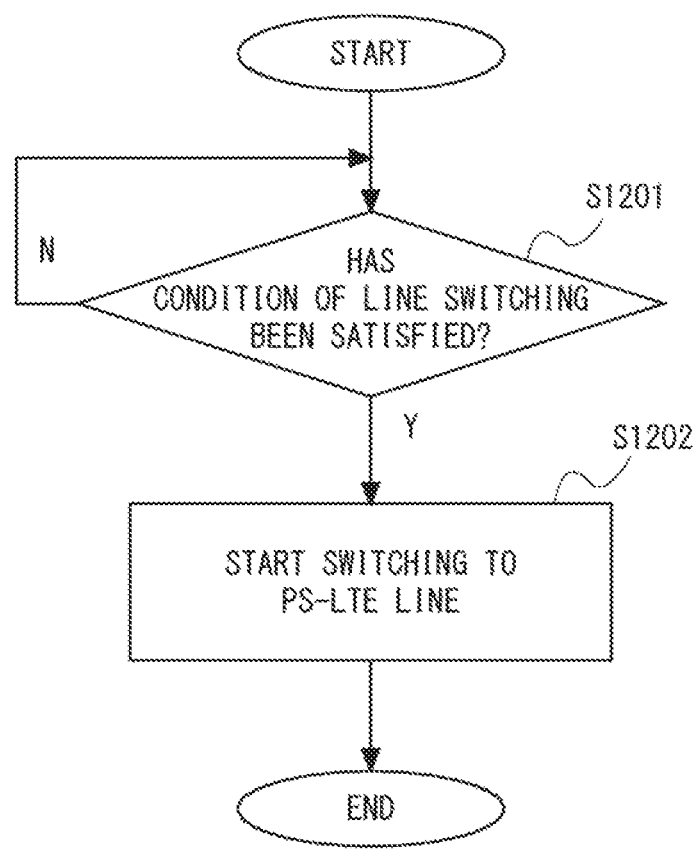
FIG. 31 shows an example of an operation performed by the UE in the procedure for switching networks according to the third embodiment.

The following describes a procedure for switching from data distribution using the commercial LTE network to data distribution using the PS-LTE network. FIG. 29 is a sequence diagram showing an example of such a switching procedure. FIGS. 30 and 31 show an operation performed by the line selecting/switching unit 2402 and an operation performed by the UE 2420 in the procedure shown in FIG. 31, respectively.

The procedures shown in FIGS. 29 to 31 and the operations of the line selecting/switching unit 2402 and the UE 2420 shown in FIGS. 29 to 31 are basically the same as those shown in FIGS. 26 to 28, and thus duplicated explanations thereof are omitted. A determination condition of line switching in Step S1101 may be opposite to that used in Step S901. Similarly, a determination condition of line switching in Step S1201 may be opposite to that used in Step S1001.

The processes of the P-GW, the line selecting/switching unit, and the UE described in the above embodiments may be implemented with the use of a semiconductor processing device, including an Application Specific Integrated Circuit (ASIC). Further, these processes may be implemented by causing a computer including at least one processor (e.g., a microprocessor, a Central Processing Unit (CPU), or a Micro Processing Unit (MPU)) to execute a program. Specifically, one or more programs may be supplied to a computer. The program includes a set of instructions (software codes) that, when loaded into a computer, causes the computer to perform the above-described processes of the P-GW, the line selecting/switching unit, or the UE.

This program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

The line selecting/switching unit described in the above embodiments may be placed in the commercial LTE network instead of being placed in the PS-LTE network. Alternatively, the line selecting/switching unit described in the above embodiments may be placed in a third network (e.g., a Mobile Virtual Network Enabler (MVNE) network) different from either the PS-LTE network or the commercial LTE network.

The above-described embodiments provide examples in which the PS-LTE network and the commercial LTE network can be used for communication on an application layer between the application server and the UEs. However, applications of the above-described embodiments are not limited to public safety. For example, the above-described embodiments may be applied to a system in which a private LTE network and a commercial LTE network can be used for communication on an application layer between an application server and UEs. Further, the above-described embodiments may be applied to a system in which two or more LTE networks can be used for communication on an application layer between an application server and UEs.

Further, the above-described embodiments are merely examples of applications of the technical ideas obtained by the inventor. These technical ideas are not limited to the above-described embodiments and various modifications can be made thereto.

For example, the whole or part of the embodiments disclosed above can be described as, but not limited to, the following supplementary notes.

(Supplementary Note 1)

A terminating apparatus configured to terminate first communication, second communication, and third communication, wherein the first communication is unicast communication, the second communication is multicast communication, the first and the second communications are provided by a first network, and the third communication is provided by a second network.

(Supplementary Note 2)

The terminating apparatus described in Supplementary note 1, wherein the terminating apparatus is configured to select at least one of the first communication, the second communication, and the third communication for use in data distribution to a radio terminal.

(Supplementary Note 3)

The terminating apparatus described in Supplementary note 1 or 2, wherein the first network and the second network are operated by different network operators.

(Supplementary Note 4)

The terminating apparatus described in any one of Supplementary notes 1 to 3, wherein the terminating apparatus is placed in the first network.

(Supplementary Note 5)

The terminating apparatus described in any one of Supplementary notes 1 to 3, wherein the terminating apparatus is placed in the second network.

(Supplementary Note 6)

The terminating apparatus described in any one of Supplementary notes 1 to 3, wherein the terminating apparatus is placed in a third network different from the first and the second networks.

(Supplementary Note 7)

The terminating apparatus described in any one of Supplementary notes 1 to 6, wherein the first network is a Public Safety Long Term Evolution (PS-LTE) network, and the second network is a commercial LTE network.

(Supplementary Note 8)

The terminating apparatus described in Supplementary note 7, wherein the first communication uses dedicated Evolved Packet System (EPS) bearer services provided by the PS-LTE network, the second communication uses a Multimedia Broadcast Multicast Service (MBMS) bearer service provided by the PS-LTE network, and the third communication uses dedicated EPS bearer services provided by the commercial LTE network.

(Supplementary Note 9)

The terminating apparatus described in Supplementary note 7 or 8, wherein the terminating apparatus is configured to select at least one of the first communication, the second communication, and the third communication for data distribution to a radio terminal while taking into account a transmission data size to the radio terminal or a received data size from the radio terminal.

(Supplementary Note 10)

The terminating apparatus described in Supplementary note 9, wherein the terminating apparatus is configured to select the third communication using the commercial LTE network when the transmission data size or the received data size exceeds a predetermined threshold.

(Supplementary Note 11)

The terminating apparatus described in Supplementary note 7 or 8, wherein the terminating apparatus is configured to select at least one of the first communication, the second communication, and the third communication for data distribution to the radio terminal while taking into account a usage rate of the PS-LTE network.

(Supplementary Note 12)

The terminating apparatus described in Supplementary note 11, wherein the terminating apparatus is configured to select the third communication using the commercial LTE network when the usage rate of the PS-LTE network exceeds a predetermined threshold.

This application is based upon and claims the benefit of priority from Japanese patent application No. 2016-241717, filed on Dec. 13, 2016, the disclosure of which is incorporated herein in its entirety by reference.

REFERENCE SIGNS LIST 801, 1601, 2401 P-GW
802, 1602, 2402 LINE SELECTING/SWITCHING UNIT

What is claimed is:

1. A terminating apparatus comprising:
a memory; and
at least one processor coupled to the memory and configured to select at least one of first communication, second communication, and third communication, for use in data distribution to a radio terminal, wherein
the first communication is unicast communication, the second communication is multicast communication, the first and the second communications are provided by a Public Safety Long Term Evolution (PS-LTE) network, the third communication is provided by a commercial LTE network, and the processor is configured to select the third communication using the commercial LTE network when a size of data transmitted to the radio terminal or a size of data received from the radio terminal exceeds a first predetermined threshold, or when a usage rate of the PS-LTE network exceeds a second predetermined threshold.

2. The terminating apparatus according to claim 1, wherein the PS-LTE network and the commercial LTE network are operated by different network operators.

3. The terminating apparatus according to claim 1, wherein the terminating apparatus is placed in the PS-LTE network.

4. The terminating apparatus according to claim 1, wherein the terminating apparatus is placed in the commercial LTE network.

5. The terminating apparatus according to claim 1, wherein the terminating apparatus is placed in a network different from the PS-LTE network first and the commercial LTE network.

6. The terminating apparatus according to claim 1, wherein
the first communication uses dedicated Evolved Packet System (EPS) bearer services provided by the PS-LTE network,
the second communication uses a Multimedia Broadcast Multicast Service (MBMS) bearer service provided by the PS-LTE network, and
the third communication uses dedicated EPS bearer services provided by the commercial LTE network.

7. The terminating apparatus according to claim 1, wherein the processor is configured to select the third communication using the commercial LTE network when the size of data transmitted to the radio terminal or the size of data received from the radio terminal exceeds the first predetermined threshold.

8. The terminating apparatus according to claim 1, wherein the processor is configured to select the third communication using the commercial LTE network when the usage rate of the PS-LTE network exceeds the second predetermined threshold.

9. The terminating apparatus according to claim 1, wherein the processor is configured to select the first or second communication using the PS-LTE network when the size of data transmitted to the radio terminal or the size of data received from the radio terminal does not exceed the first predetermined threshold.

10. The terminating apparatus according to claim 1, wherein the processor is configured to select the first or second communication using the PS-LTE network when the usage rate of the PS-LTE network does not exceed the second predetermined threshold.

* * * * *